(12) United States Patent
Ochiai

(10) Patent No.: US 7,546,358 B1
(45) Date of Patent: Jun. 9, 2009

(54) NETWORK DEVICE CONTROL APPARATUS, NETWORK DEVICE CONTROL METHOD, NETWORK DEVICE CONTROL PROGRAM, AND COMPUTER-READABLE RECORDING MEDIUM STORING NETWORK DEVICE CONTROL PROGRAM THEREIN

(75) Inventor: Masato Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,941

(22) Filed: Feb. 22, 2000

(30) Foreign Application Priority Data

Feb. 24, 1999 (JP) .................................. 11-046475

(51) Int. Cl.
*G06F 15/177* (2006.01)
(52) U.S. Cl. .................... 709/222; 709/227; 709/228
(58) Field of Classification Search ................ 709/200, 709/220, 227–245, 222
See application file for complete search history.

(56) References Cited

U.S. PATENT DOCUMENTS

| 5,675,741 | A | * | 10/1997 | Aggarwal et al. | 709/242 |
|---|---|---|---|---|---|
| 5,699,489 | A | * | 12/1997 | Yokomizo | 358/1.9 |
| 5,708,654 | A | * | 1/1998 | Arndt et al. | 370/242 |
| 5,732,071 | A | * | 3/1998 | Saito et al. | 370/255 |
| 5,774,640 | A | * | 6/1998 | Kurio | 714/4 |
| 5,850,388 | A | * | 12/1998 | Anderson et al. | 370/252 |
| 5,896,382 | A | * | 4/1999 | Davis et al. | 370/401 |
| 5,923,824 | A | * | 7/1999 | Yokomizo | 358/1.9 |
| 5,936,966 | A | * | 8/1999 | Ogawa et al. | 370/469 |
| 6,009,103 | A | * | 12/1999 | Woundy | 370/401 |
| 6,016,388 | A | * | 1/2000 | Dillon | 709/242 |
| 6,032,193 | A | * | 2/2000 | Sullivan | 709/239 |
| 6,049,825 | A | * | 4/2000 | Yamamoto | 709/221 |
| 6,061,334 | A | * | 5/2000 | Berlovitch et al. | 370/255 |
| 6,070,187 | A | * | 5/2000 | Subramaniam et al. | 709/220 |
| 6,075,776 | A | * | 6/2000 | Tanimoto et al. | 370/254 |
| 6,115,545 | A | * | 9/2000 | Mellquist | 709/220 |
| 6,141,690 | A | * | 10/2000 | Weiman | 709/228 |
| 6,189,102 | B1 | * | 2/2001 | Beser | 713/201 |
| 6,216,171 | B1 | * | 4/2001 | Isono et al. | 709/250 |

(Continued)

FOREIGN PATENT DOCUMENTS

JP    A-08-181704    7/1996

(Continued)

OTHER PUBLICATIONS

David Brownell, RFC 1931 Dynamic RARP Extensions for Automatic Network Address Acquistion, RFC 1931 pp. 1-10.*

(Continued)

*Primary Examiner*—David E England
(74) *Attorney, Agent, or Firm*—Fitzpatrick, Cella, Harper & Scinto

(57) ABSTRACT

The invention provides a network device control apparatus which can set an IP address to be inherently set by using a general program while an erroneous setup of the IP address by the general program is avoided. In the network device control apparatus according to the invention, data is received from a network by using a standard protocol, a special attribute value is detected in the standard protocol with respect to the data, and when a destination physical address of the data is the same as its own physical address, various parameters are set in accordance with the attribute value.

17 Claims, 19 Drawing Sheets

U.S. PATENT DOCUMENTS

| | | | | |
|---|---|---|---|---|
| 6,266,726 | B1 * | 7/2001 | Nixon et al. | 710/105 |
| 6,301,016 | B1 * | 10/2001 | Matsueda et al. | 358/407 |
| 6,310,858 | B1 * | 10/2001 | Kano et al. | 370/235 |
| 6,389,462 | B1 * | 5/2002 | Cohen et al. | 709/218 |
| 6,434,620 | B1 * | 8/2002 | Boucher et al. | 709/230 |
| 6,438,607 | B1 * | 8/2002 | Fujimori et al. | 709/245 |
| 6,446,200 | B1 * | 9/2002 | Ball et al. | 713/1 |
| 6,532,217 | B1 * | 3/2003 | Alkhatib et al. | 370/252 |

FOREIGN PATENT DOCUMENTS

JP      A-09-200247      7/1997

OTHER PUBLICATIONS

Bill Croft, Internet RFC/STD/FYI/BCP Archives, http://www.faqs.org/rfcs/, Sep. 1985, RFC 951.*

W. Wimer, Internet RFC/STD/FYI/BCP Archives, http://www.faqs.org/rfcs/,Oct. 1993, RFC 1532.*

W. Wimer, Internet RFC/STD/FYI/BCP Archives, http://www.faqs.org.rfcs/, Oct. 1993RFC 1542.*

Finlayson et al., RFC 903—A Reverse Address Resolution Protocol., Stanford University, RFC 903, pp. 1-4.*

T. Pradley et al., Inverse Address Resolution Protocol, Avici Systems, Inc., RFC 2390, pp. 1-8.*

R. Droms, Dynamic Host Configuration Protocol Mar. 1997, RFC, RFC 2131, pp. 1-45.*

D. Brownell, Dynamic RARP Extensions for Automatic Network Address Acquisition April 1996, RFC, RFC 1931, pp. 1-11.*

S. Alexander et al. DHCP Options and BOOTP Vendor Extentions Mar. 1997, RFC, RFC 2132, pp. 1-34.*

W.R. Stevens, "IP: Internet Protocol", TCP/IP Illustrated vol. 1: The Protocols, Chapter 3, pp. 37-46, 79-81, 95 and 96; first Japanese edition, Mar. 31, 1997; copy in English also.

* cited by examiner

ICMP MESSAGE FRAME

NETWORK DEVICE CONTROL APPARATUS, NETWORK DEVICE CONTROL METHOD, NETWORK DEVICE CONTROL PROGRAM, AND COMPUTER-READABLE RECORDING MEDIUM STORING NETWORK DEVICE CONTROL PROGRAM THEREIN

BACKGROUND OF THE INVENTION

1. Field of the Invention

The invention relates to a network device control apparatus connected to a network and, more particularly, to a setting method of a network device control apparatus.

2. Related Background Art

In recent years, a local area network (LAN) mutually connecting computers has been spread and constructed in various locations such as one floor of a building, whole building, district, or further large area. Moreover, a world-wide network is constructed by mutually connecting a plurality of LANs. In each of the mutually connected LANs, a variety of hardware mutually connecting techniques and a few network protocols are used.

Particularly, there is a TCP/IP as a typical network protocol in the LAN. The TCP/IP is a group of layered network protocols and comprises standardized protocols such as: IP (Internet Protocol), ICMP (Internet Control Message Protocol), ARP (Address Resolution Protocol), etc. in a network layer; and TCP (Transmission Control Protocol), UDP (User Datagram Protocol), etc. in a transport layer. (With respect to the details of each protocol and an IP address system, refer to W. Richard Stevens, "Detailed Explanation TCP/IP", translation checked by Naoji Inoue, translated by Yasuo Tachibana, Soft Bank Co., Ltd., first edition, Mar. 31, 1997.)

In the TCP/IP protocol, in case of performing a network communication, it is necessary to unconditionally determine a logic address in a network such as an IP address every network device apparatus. The IP address is constructed by 32 bits (4 bytes) and is generally expressed like 150.61.146.100 (0x963d9264) by dividing 32 bits every 8 bits.

At present, there are various methods of setting the IP address into the network device apparatus. Generally, in case of a computer terminal, the IP address is inputted from an annexed keyboard to the computer terminal and the IP address can be set to the computer terminal.

However, in a network device apparatus for which no keyboard is equipped, for example, the following method is used: (1) a method whereby when a power supply of the network device apparatus is turned on, the network device apparatus obtains an IP address from a server of the network and sets it by using a protocol such as DHCP (Dynamic Host Configuration Protocol), BOOTP, RARP, or the like; (2) a method whereby an IP address is set to the network device apparatus from the computer terminal of the network by its own protocol; or the like.

However, according to the method (1), the server is certainly necessary for the network and the setup in the server has to be also performed, so that a burden on the user is large. According to the method (2), a computer terminal to communicate by using the own protocol and a program which operates at the computer terminal are necessary, so that a burden on the user is also large.

In consideration of the above drawbacks, as a method of setting the IP address to the network device apparatus, a method whereby there is no need to install the dedicated server to the network and the IP address is set by using a standard protocol or a standard program is demanded.

In recent years, therefore, a method whereby an ICMP protocol is used as a standard protocol and a ping program is used as a standard program and the IP address is set is considered. The ping program is a program for transmitting an echo request message of the ICMP protocol to the network device apparatus and waiting for a return of an echo reply message. The ping program is usually installed in a computer in which the TCP/IP protocol has been installed.

The network device apparatus which received the ICMP echo request message which is transmitted from the ping program recognizes the IP address serving as a destination address as its own IP address and replies the ICMP echo reply message.

Specifically speaking, prior to executing the ping program, a physical address of the network device apparatus and an IP address to be set in the network device apparatus are made to correspond to each other by using a program called an "arp". Thus, in the case where the IP address is designated by the ping program and the ICMP echo request message is transmitted, the physical address of the network device apparatus is set to a destination physical address of the ICMP echo request message.

The network device apparatus receives the ICMP echo request message in which the own physical address has been designated. Generally, the network device apparatus determines that the destination IP address of the ICMP echo request message differs from the own IP address. However, in the case where the ICMP echo request message to the own physical address is received as a setup of the network device apparatus, the apparatus has been preset in a manner such that the destination IP address of the message is recognized as an own IP address.

The network device apparatus uses the IP address recognized as its own IP address as a temporary IP address and subsequently performs a network communication by the IP address.

The arp program is usually installed in a computer in which the TCP/IP protocol has been installed in a manner similar to the ping program.

SUMMARY OF THE INVENTION

In the conventional example, however, since the ping program is extremely general, the IP address of the network device apparatus can be also easily set by another network application using the ping program.

There is, consequently, a problem such that an erroneous IP address is set.

For example, in a network management program for periodically executing the ping program and monitoring whether each network device apparatus on the network returns a reply or not, in the conventional network device apparatus, an IP address different from the IP address to be inherently set is set.

The invention is made to solve the above problems and it is an object of the invention to provide a network device apparatus such that an IP address to be inherently set can be set by using a general program while an erroneous setup of an IP address by a general program is avoided.

To accomplish the above object, according to the invention, data is received from a network by using a standard protocol, a special attribute value is detected in the standard protocol with respect to the data, when a destination physical address of the data is the same as its own physical address, various parameters are set in accordance with the attribute value.

Further, according to the invention, in the case where a destination logic address of the data and its own logic address differ and the destination physical address is the same as the own physical address, various parameters are set in accordance with the attribute value.

Further, according to the invention, the destination logic address of the data is set to the own logic address.

Further, according to the invention, the standard protocol is an Internet protocol and the logic address is an IP address.

Further, according to the invention, the physical address is an MAC address.

Further, according to the invention, the data is an ICMP echo message by an ICMP protocol.

Further, according to the invention, the attribute value is a data length of the data.

Further, according to the invention, the attribute value is a TTL value of the data.

According to the invention, an ICMP echo message is received, a data length of the ICMP echo message is detected, when a destination MAC address is the same as the own MAC address, various setting parameters are set in accordance with the value of the data length.

Further, according to the invention, in the case where the destination IP address of the ICMP echo message and the own IP address differ and the destination MAC address and the own MAC address are the same, various setting parameters are set in accordance with the value of the data length.

Further, according to the invention, the destination IP address of the ICMP echo message is set to the own IP address.

According to the invention, a network device control apparatus, a network device control method, and a network device control program for realizing the above means are provided and a computer-readable recording medium in which the network device control program has been stored is also provided.

DETAILED DESCRIPTION OF THE PREFERRED EMBODIMENTS

First Embodiment

An embodiment of the invention will now be described hereinbelow with reference to the drawings.

Figure 1:
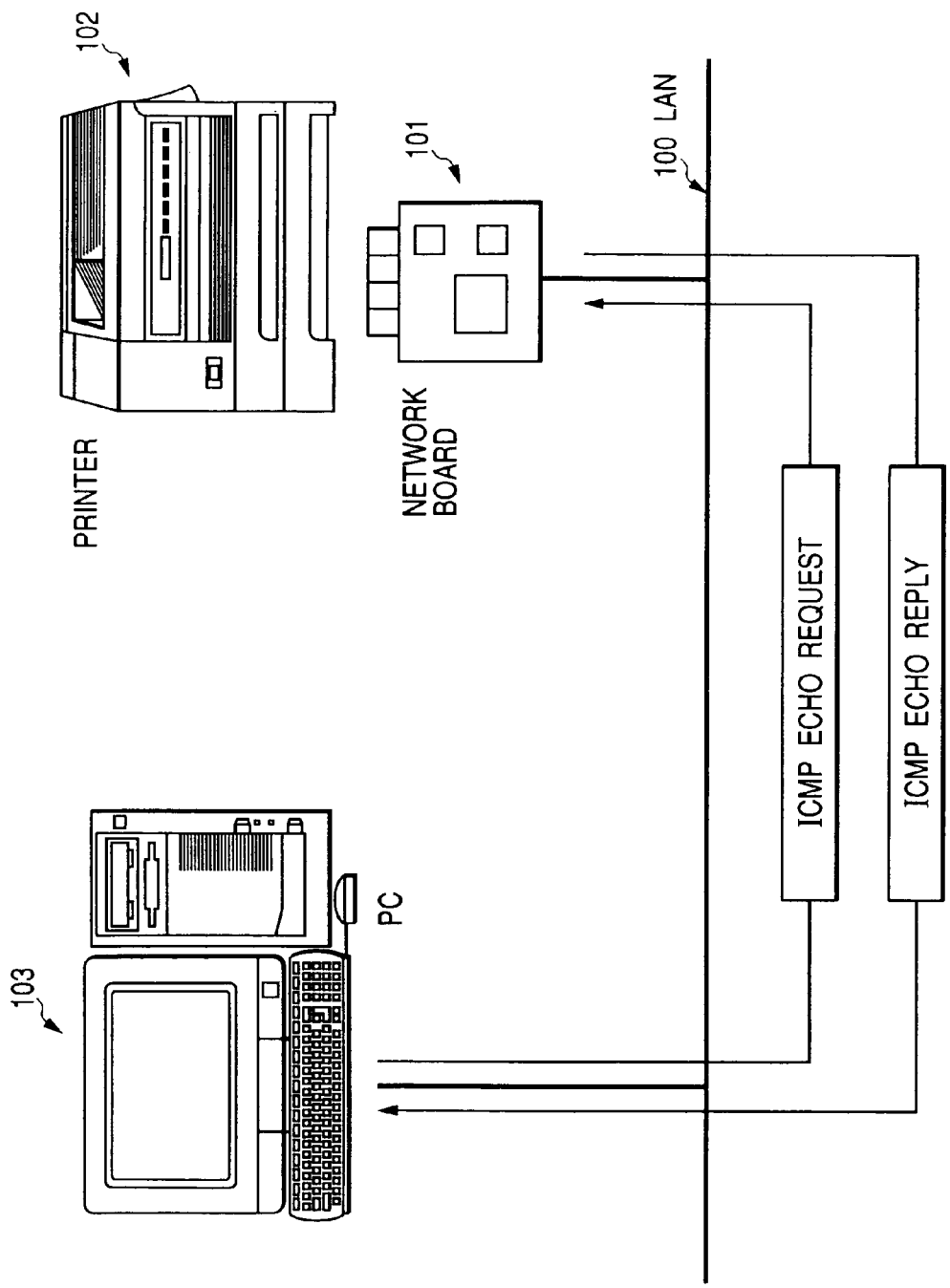
FIG. 1 is a schematic diagram showing a construction of a network in the case where a network board is connected to a printer.

FIG. 1 is a schematic diagram showing a construction of a network in the case where a network board is connected to a printer. A network board 101 is an example of a network device apparatus connected to an LAN 100. The network board is connected to the LAN through an interface such as 10Base-T having RF-45.

A personal computer (PC) 103 is also connected to the LAN 100. The PC 103 can communicate with the network board 101 through the LAN 100.

Generally, the LAN 100 provides services to a slightly local group, for example, to a user group on one floor or user groups on a plurality of continuous floors in one building. When the users are in different buildings, a wide area network (WAN) can be constructed in accordance with a distance between the users. Fundamentally, the WAN is a set of LANs formed by connecting a plurality of LANs by a high speed digital line such as a high speed integrated services digital network (ISDN) telephone or the like.

Figure 2:
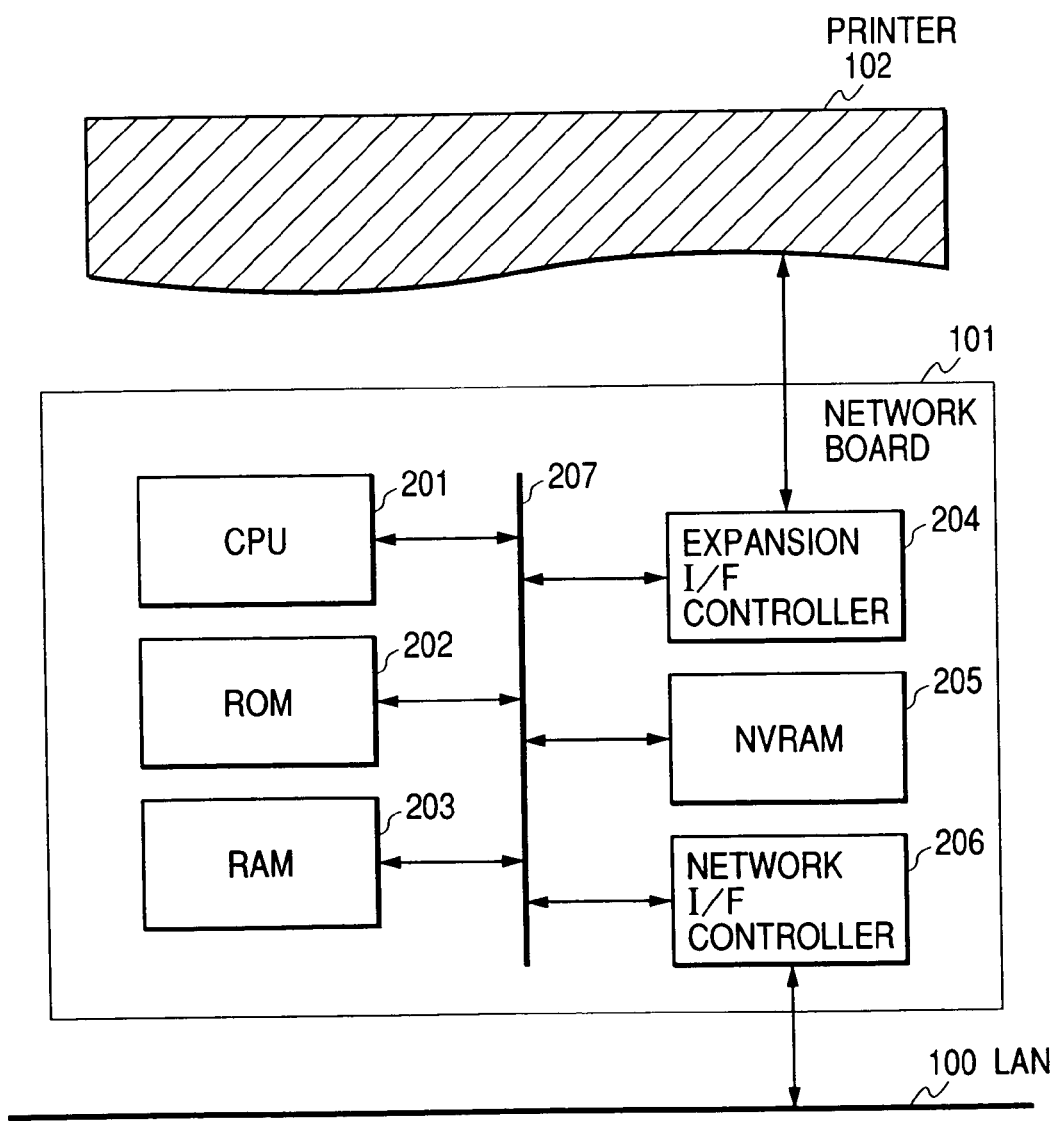
FIG. 2 is a block diagram showing an outline of a control construction of a network board 101.

FIG. 2 is a block diagram showing a control construction in the network board 101 in the embodiment. The network board 101 comprises: a CPU 201; an ROM 202; an RAM 203; an expansion I/F controller 204; an NVRAM 205; a network I/F controller 206; and a bus 207.

The CPU 201 executes a program of the embodiment stored in the ROM 202. The NVRAM 205 stores various setting parameters.

The network board 101 is connected to the network through the network I/F controller 206 and connected to a printer 102 through the expansion I/F controller 204. The network board can be also connected not only to a printer but also to a facsimile apparatus, a copying apparatus, or the like so long as it is an apparatus to which the expansion I/F controller 204 can control. Various apparatuses can be connected to the network by the network board 101.

Figure 3:
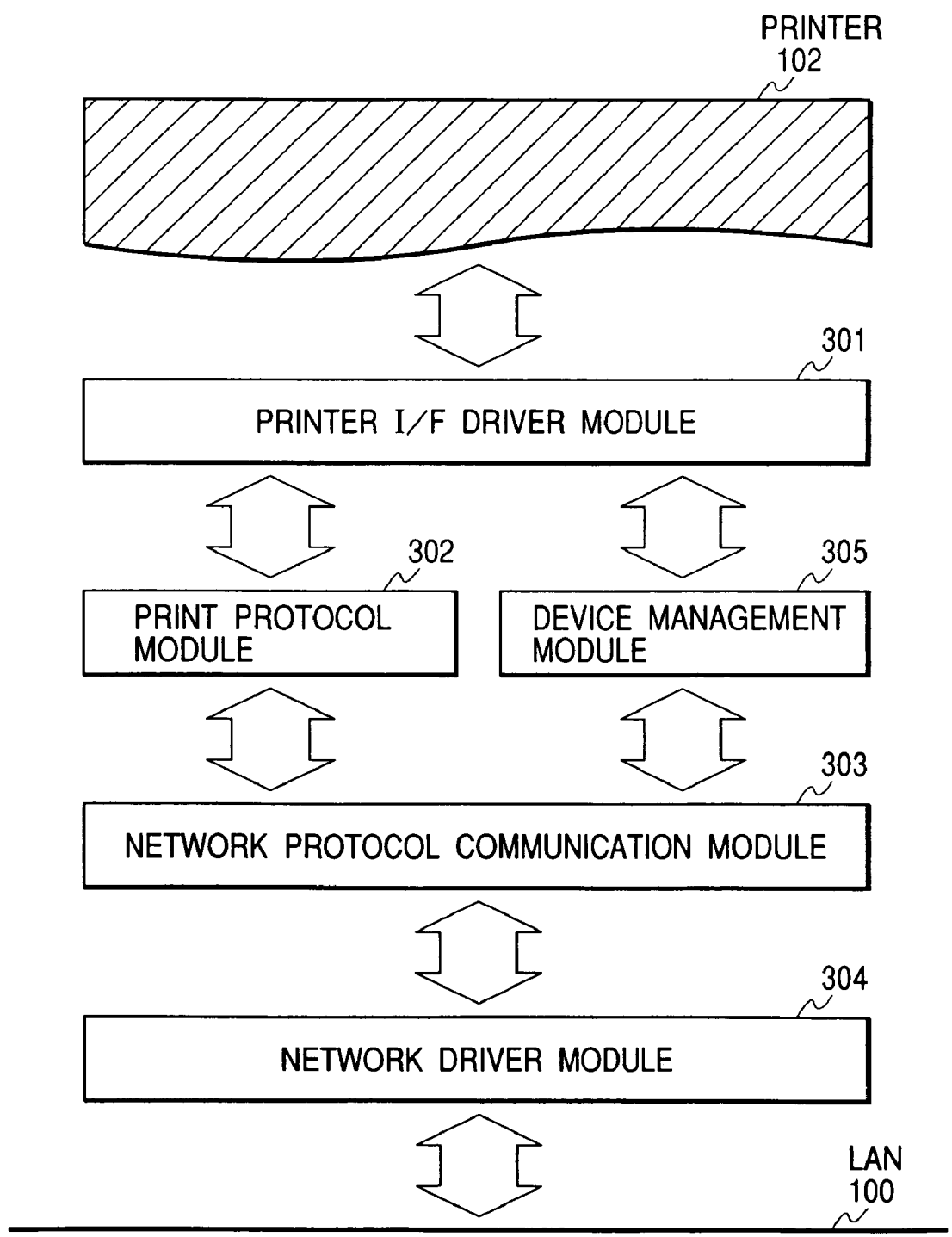
FIG. 3 is a block diagram showing an outline of a program construction of the network board 101.

A program construction of the network board 101 will now be described. FIG. 3 is a block diagram showing a program construction of the network board 101 in the embodiment.

A printer I/F driver module 301 controls the expansion I/F controller 204 and transmits and receives data to/from the printer. A print protocol module 302 supports a general print protocol in the network. A network protocol communication module 303 performs a communication control of the network. A network driver module 304 controls the network I/F controller 206 and actually transmits and receives a packet to/from the LAN 100.

The print protocol module 302 receives print data from the network through the network protocol communication module 303 in accordance with a print communication procedure which has been predetermined by the protocol. The received print data is sent to the printer 102 through the printer I/F driver module 301.

A device management module 305 processes the setting and reference of information regarding the network board 101 by the PC 103 and processes the setting and reference of printer information.

Figure 4:
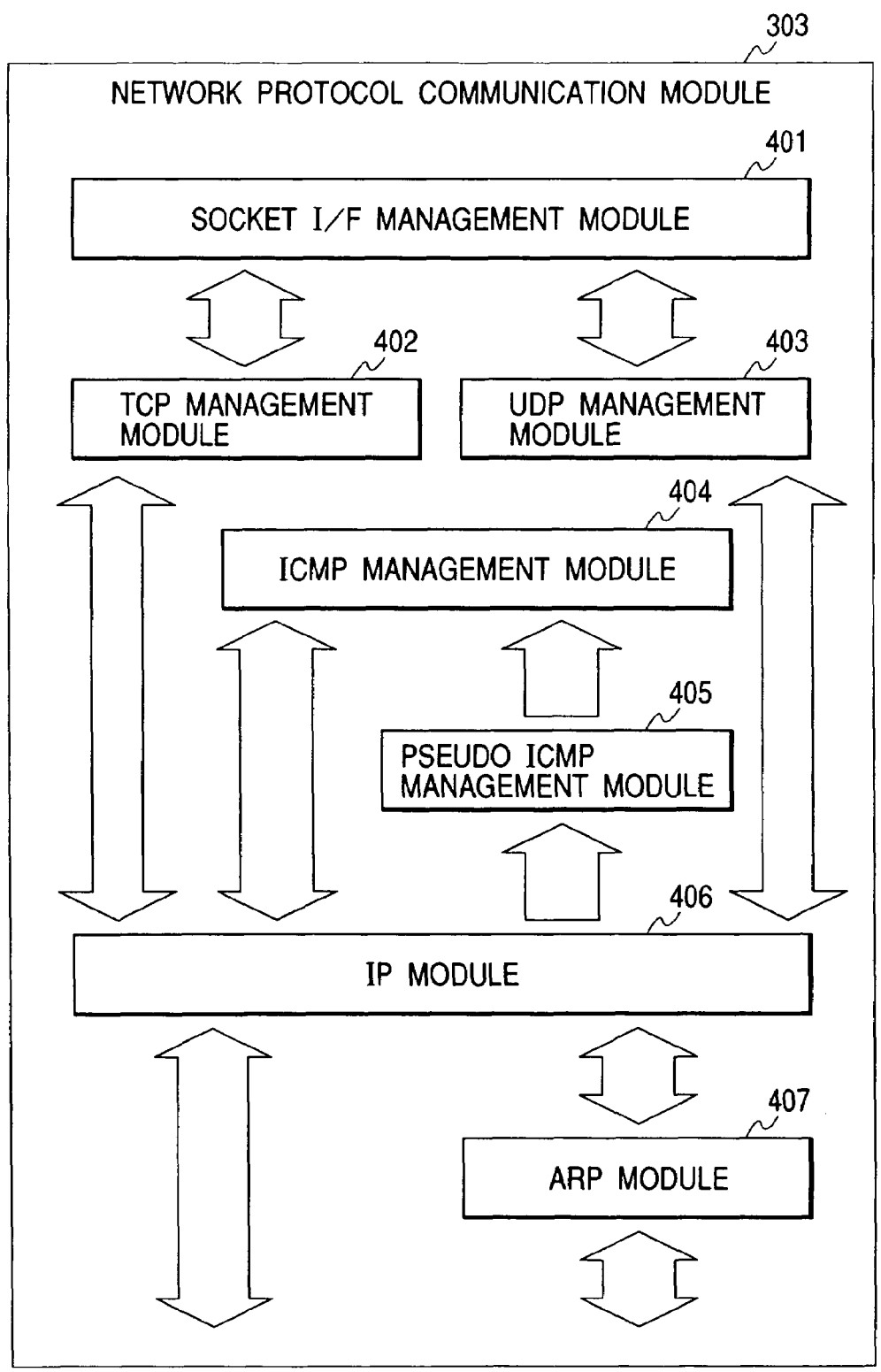
FIG. 4 is a block diagram showing an outline of a program construction regarding a TCP/IP protocol in a network protocol communication module.

The network protocol communication module 303 in FIG. 3 will now be described more in detail. FIG. 4 is a program constructional diagram regarding a TCP/IP protocol in the network protocol communication module 303.

A socket interface management module 401 provides an interface called a socket in TCP/IP to the print protocol module 302 and device management module 305. Whether the data sent from the PC 103 is print data or a request for setting or referring to the network board information or print information is discriminated by the socket interface management module 401. The print data is sent to the print protocol module 302. The request for setting or referring to the network board information or print information is sent to the device management module 305.

A TCP protocol has been installed in a TCP management module 402. A UDP protocol has been installed in a UDP management module 403. An IP protocol has been installed in an IP module 406. By combining the TCP management module 402 or UDP management module 403 with the IP module 406, a communication by the TCP/IP with computers connected to the LAN 100 can be performed.

An ICMP protocol has been installed in an ICMP management module 404. A pseudo ICMP management module 405 is a module for realizing the invention by using the ICMP management module 404. Processing contents of the pseudo ICMP management module 405 using the ICMP protocol will be described in detail hereinlater. An ARP (Address Resolution Protocol) protocol has been installed in an ARP module 407. The ARP protocol is a protocol to know a hardware address from the IP address.

Figure 5:
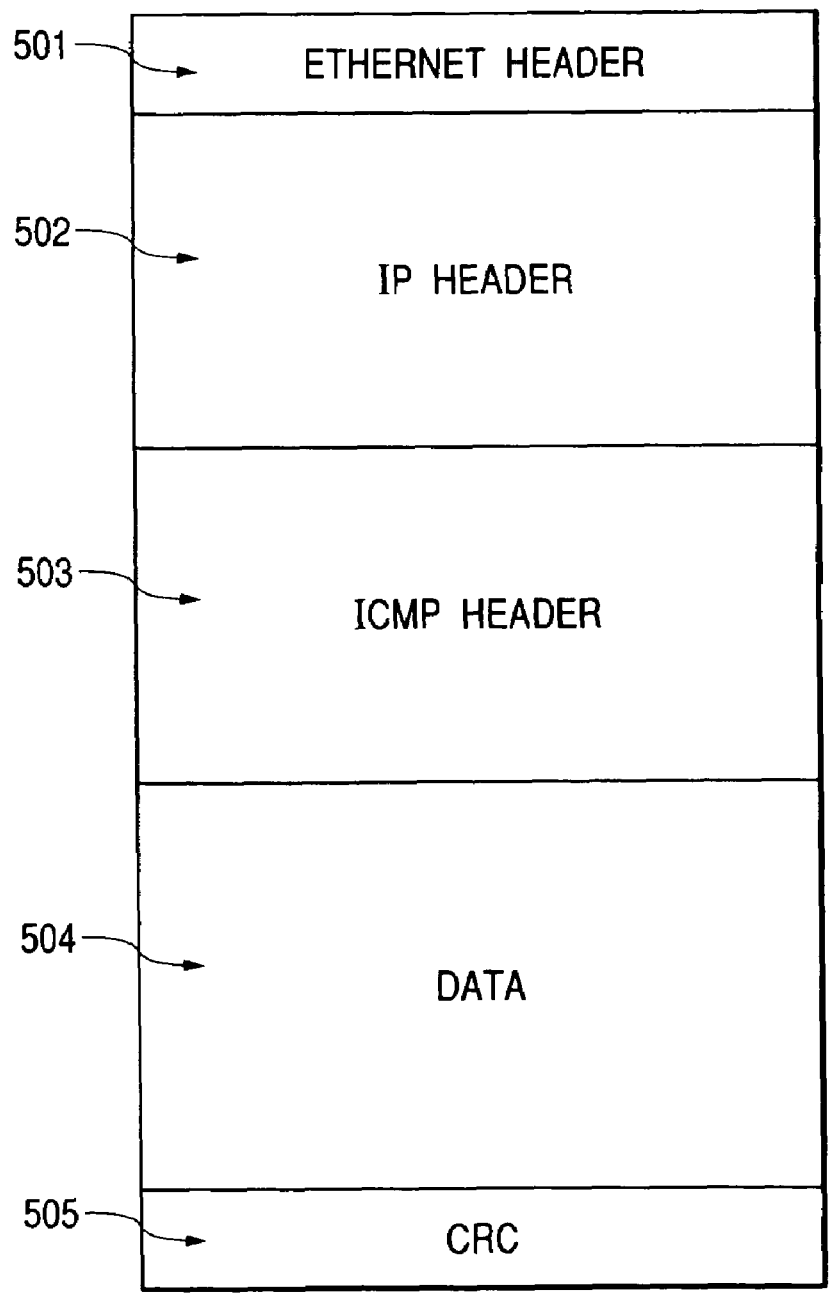
FIG. 5 is a schematic diagram showing an outline of a frame of an ICMP echo message.

FIG. 5 is a conceptual diagram showing a frame outline of the ICMP message. The ICMP message comprises an Ethernet Header 501, an IP Header 502, an ICMP Header 503, Data 504, and a CRC 505. The CRC 505 is added to the end of frame. Each of them will now be described hereinbelow.

Figure 6:
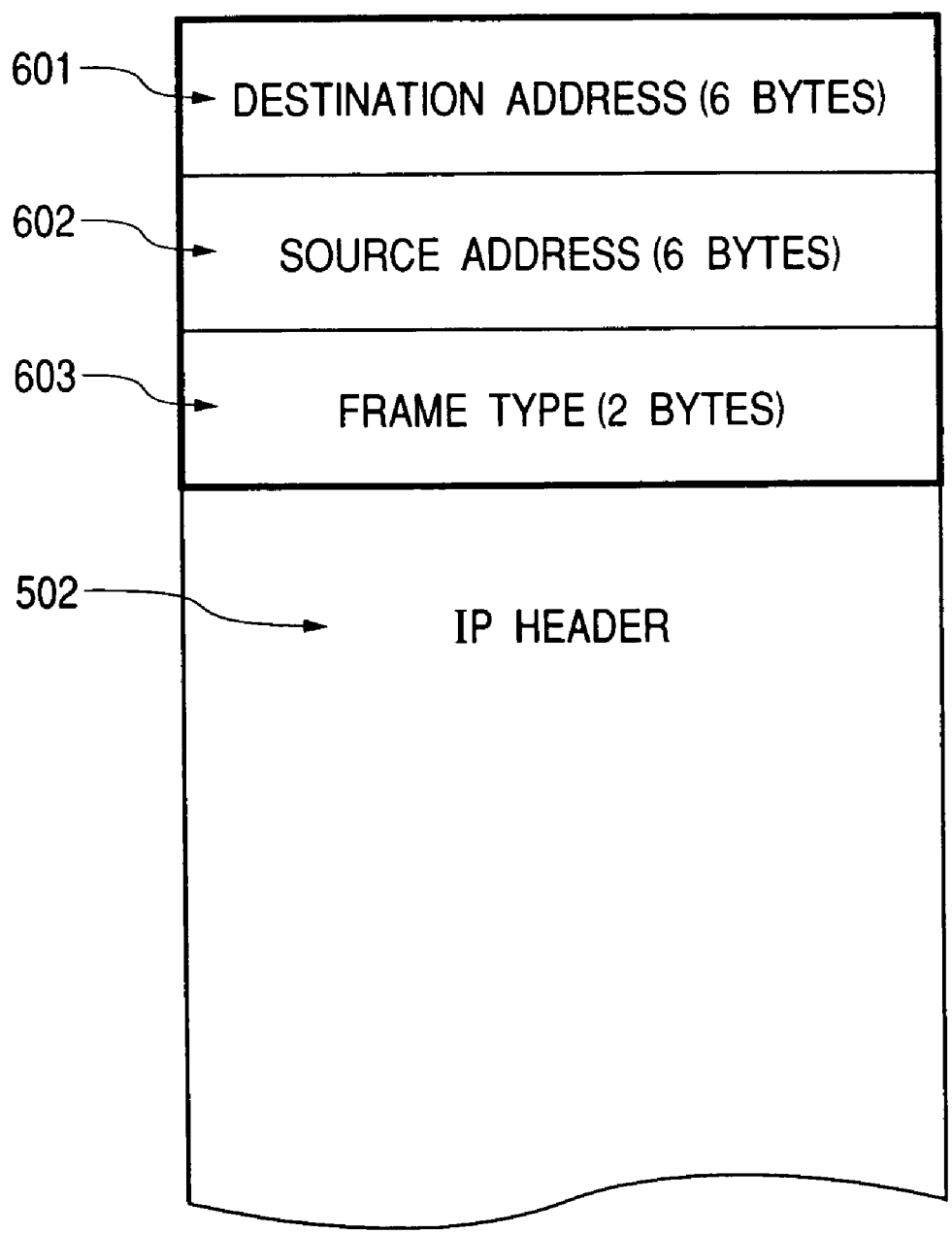
FIG. 6 is a schematic diagram showing an Ethernet Header.

The Ethernet Header 501 will be first described. FIG. 6 is a schematic diagram of the Ethernet Header in the embodiment. In the embodiment, a packet by the TCP/IP protocol is transmitted or received by an Ethernet II format. FIG. 6 is a schematic diagram of the Ethernet Header by the Ethernet II format.

The Ethernet II Header comprises a destination address 601, a source address 602, and a frame type 603. A destination MAC (Media Access Control) address has been stored in the destination address 601. A source MAC address has been stored in the source address 602. The MAC address is a physical address that is peculiar to the apparatus in the network. In case of the Ethernet, the MAC address is a code of a length of 6 bytes.

Among six bytes, head three bytes indicate a vender code. A management and an assignment of the vender code are performed by IEEE (Institute of Electrical and Electronic Engineers in U.S.A.). Remaining three bytes indicate a code that is uniquely managed by each vender. Thus, the network apparatuses having the same MAC address do not exist in the world and different MAC addresses have been assigned to all of the network apparatuses.

The frame type 603 shows a type of an upper protocol and is determined as "0x0800" in case of IP and "0x0806" in case of ARP.

Figure 7:
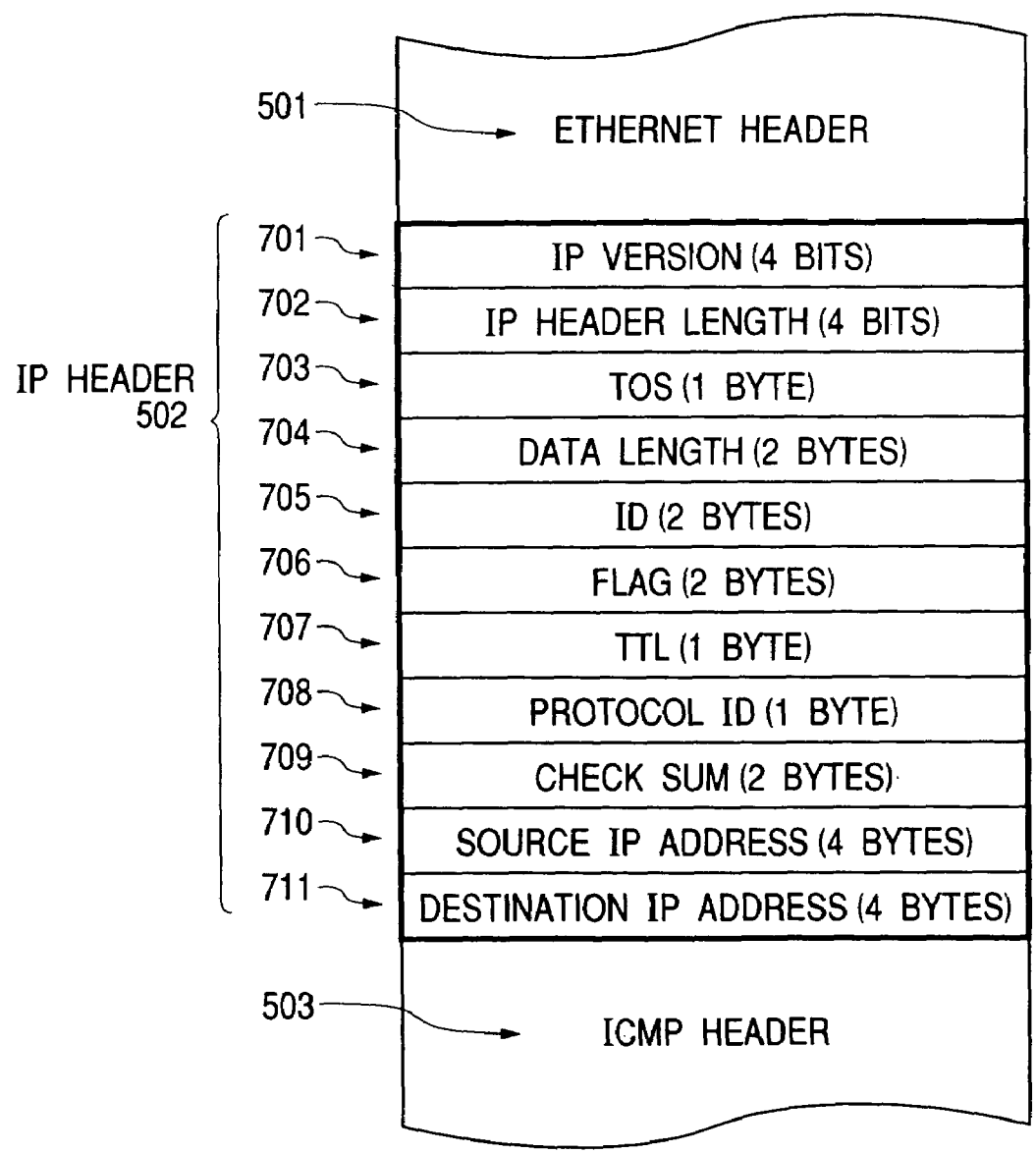
FIG. 7 is a schematic diagram showing an IP Header.

The IP Header 502 will now be described. FIG. 7 is a schematic diagram showing the IP Header 502. The IP Header 502 comprises: an IP version 701; an IP header length 702; a TOS (Type Of Service) 703; a data length 704; an identifier (ID) 705; a flag field 706; a TTL (Time To Live field) 707; a protocol ID 708; a check sum 709; a source IP address 710; and a destination IP address 711.

The IP version 701 indicates the version number of the IP Header 502. The IP header length 702 shows a size of IP Header 502 itself. The TOS 703 indicates a service quality of the transmitted IP. The data length 704 shows a size of whole packet in which the IP Header and the IP data are added. The ID 705 is used as reference information in case of handing the data to an upper protocol. The flag field 706 is used to instruct a control regarding the division of the packet. The TTL 707 shows the time during which the packet can exist in the network on a second unit basis.

The protocol ID 708 indicates what the upper protocol is. For example, the numbers are assigned to the upper protocols as follows.

1 ICMP 6 TCP 17 UDP

Figure 8:
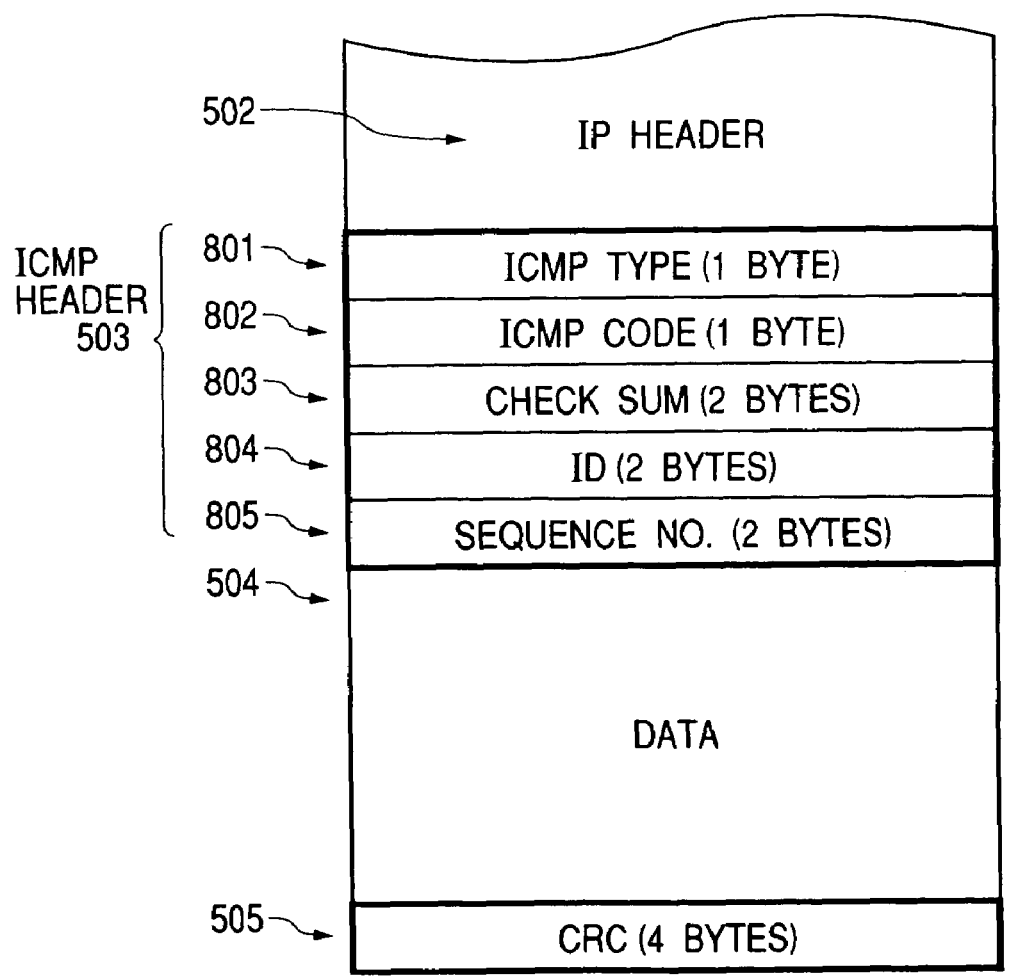
FIG. 8 is a schematic diagram showing an ICMP Header.

The ICMP Header 503 will now be described. FIG. 8 is a schematic diagram showing the ICMP Header 503. The ICMP Header 503 comprises: an ICMP type 801; an ICMP code 802; a check sum 803; an identifier 804; and a sequence number 805.

In case of the ICMP echo request message, "8" is set to the ICMP type 801. In case of the ICMP echo reply message, "0" is set to the ICMP type 801. In case of the ICMP echo message, "0" is always set to the ICMP code 802.

The identifier 804 is used when the ping program executed in the PC 103 confirms whether the requested echo command has correctly been replied or not. The sequence No. 805 is used when the ping program confirms an extinction, an erroneous order, an overlap, or the like of the packets.

Figure 11:
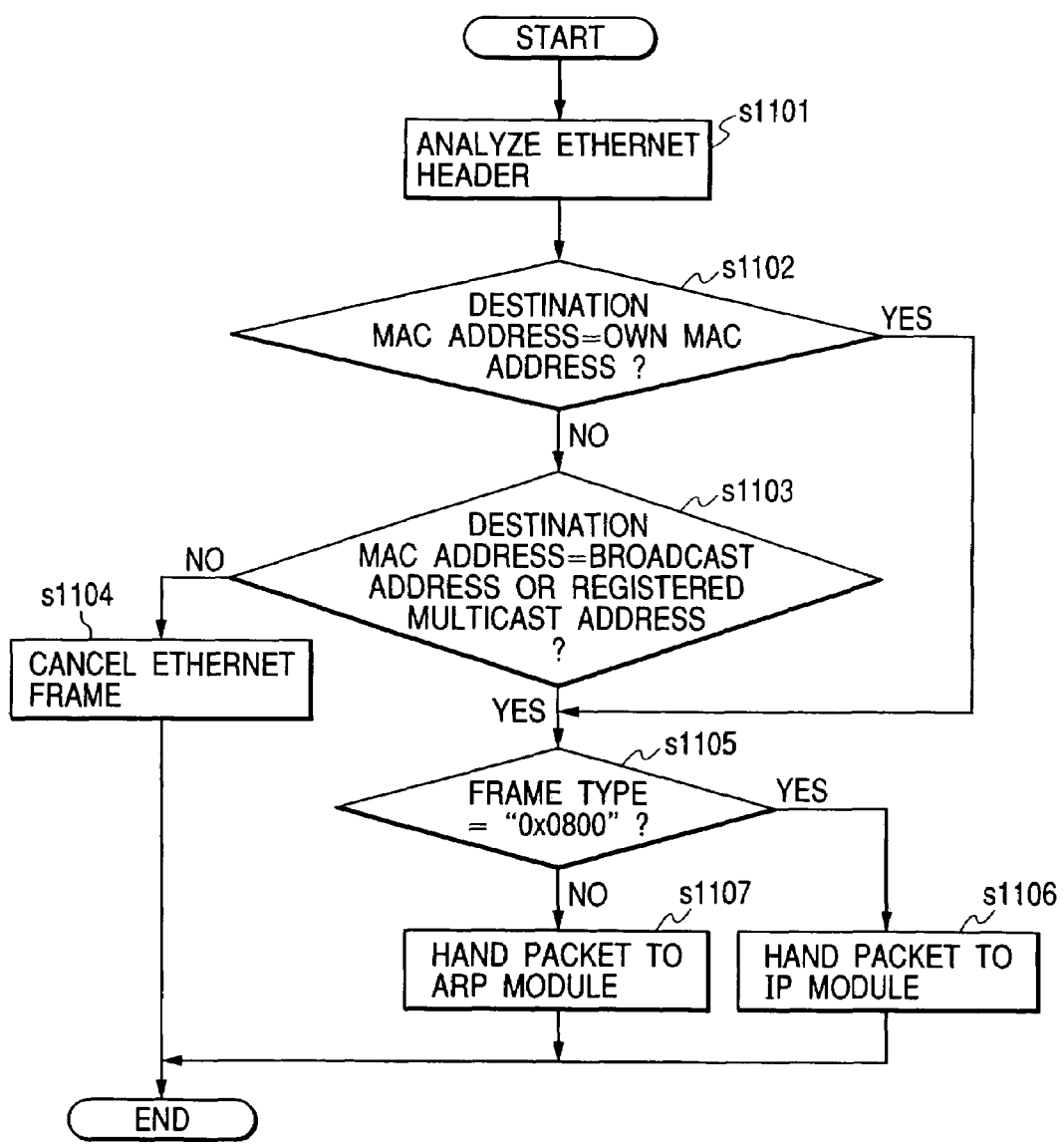
FIG. 11 is a flowchart showing a flow of processes of a general network driver module 304.
Figure 12:
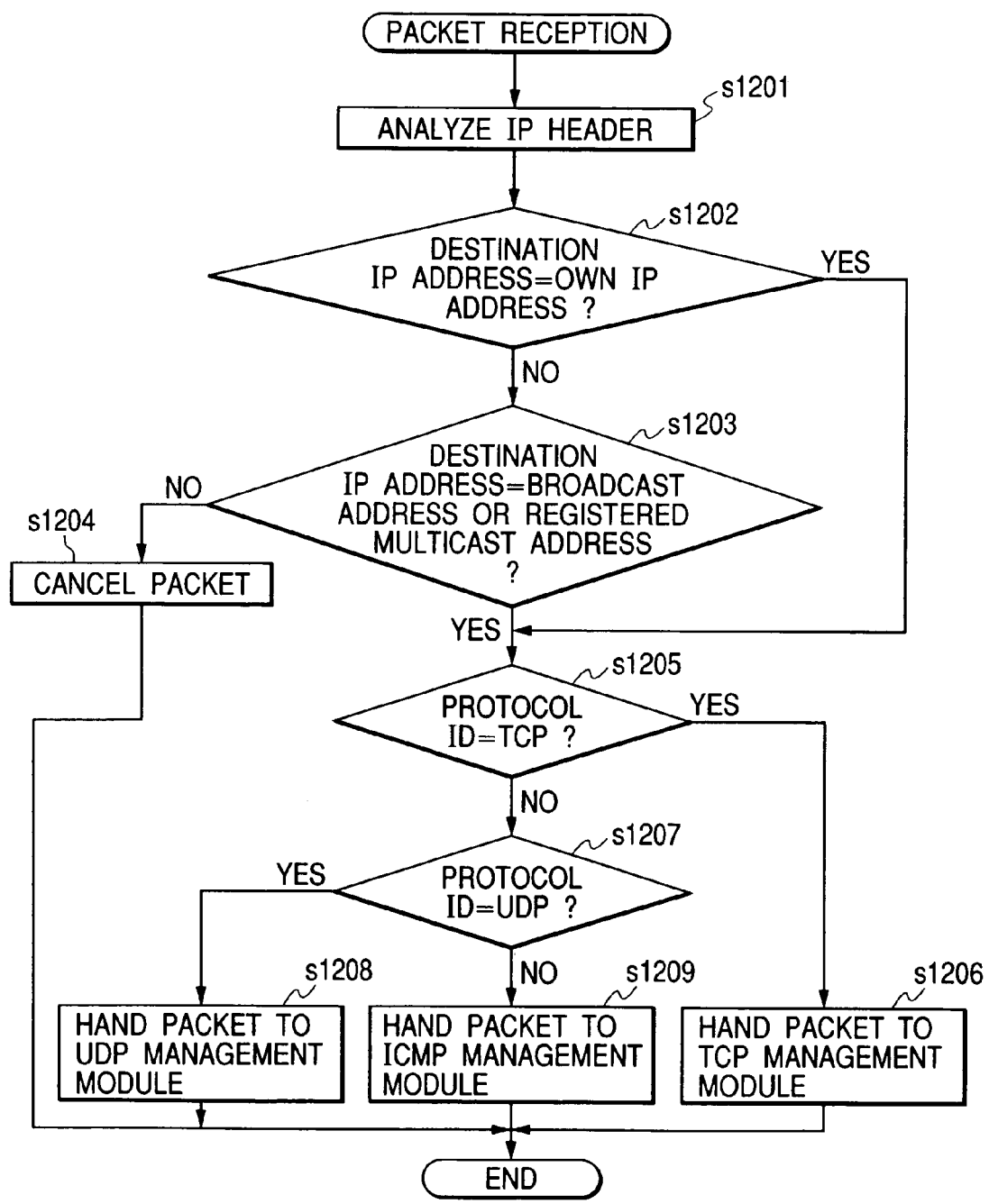
FIG. 12 is a flowchart showing a flow of processes of a general IP module 406.

A flow of processes of the ordinary ICMP echo message will now be described hereinbelow with reference to FIGS. 11 and 12. FIG. 11 is a flowchart showing the operation after the network driver module 304 received the frame as shown in FIG. 5 through the network I/F controller 206.

When the network driver module 304 receives the frame, the Ethernet Header shown in FIG. 6 is first analyzed in step S1101. In step S1102, a check is made to see if the destination MAC address of the received frame is the own MAC address. If the frame is not a frame toward the own MAC address, whether the destination MAC address is a broadcast address or a registered multicast address is discriminated in step S1103.

As results of the discriminations in steps S1102 and S1103, if the destination MAC address is none of the own MAC address, broadcast address, and registered multicast address, the received frame is cancelled in step S1104.

As results of the discriminations in steps S1102 and S1103, if the destination MAC address is one of the own MAC address, broadcast address, and registered multicast address, the frame type 603 in the Ethernet Header is checked in step S1105 and whether its value is equal to "0x0800" or not is discriminated.

If YES, it is determined that the upper protocol is the IP protocol, namely, the byte stream other than the Ethernet Header of the frame is the packet by the IP protocol, and the packet is handed to the IP module 406. In step S1105, if the value is not equal to "0x0800", it is determined that the upper protocol is the ARP protocol, namely, the byte stream other than the Ethernet Header of the frame is the packet by the ARP protocol, and the packet is handed to the ARP module 407.

As a continuation of step S1106 in FIG. 11, a flow of processes after the IP module 406 received the packet by the IP protocol will now be described. FIG. 12 is a flowchart showing the operation after the IP module 406 received the packet.

First, in step S1201, the IP Header shown in FIG. 7 is analyzed. In step S1202, whether the destination IP address 711 is the own IP address or not is discriminated. If the destination IP address is not the own IP address, whether the destination IP address is either the broadcast address or the registered multicast address is further discriminated in step S1203.

As results of the discriminations in steps S1202 and S1203, if the destination IP address is none of the own IP address, broadcast address, and registered multicast address, the received packet is cancelled in step S1204.

As results of the discriminations in steps S1202 and S1203, if the destination IP address is one of the own IP address, broadcast address, and registered multicast address, the protocol ID 708 of the IP Header is subsequently checked, thereby discriminating whether the protocol ID 708 indicates the TCP protocol or not, namely, whether the upper protocol is the TCP protocol or not. If the protocol ID 708 indicates the TCP protocol, it is determined that the bit stream other than the IP Header of the received packet is the packet by the TCP protocol, and the packet is handed to the TCP management module 402.

In step S1205, if the protocol ID 708 does not indicate the TCP protocol, whether it indicates the UDP protocol or not is further discriminated. If the protocol ID 708 indicates the UDP protocol, it is determined that the bit stream other than the IP Header of the received packet is the packet by the UDP protocol. The packet is handed to the UDP management module 403 in step S1208.

If the protocol ID 708 shows neither the TCP protocol nor the UDP protocol, it is determined that it indicates the ICMP protocol. The packet is handed to the ICMP management module 404 in step S1209.

Figure 13:
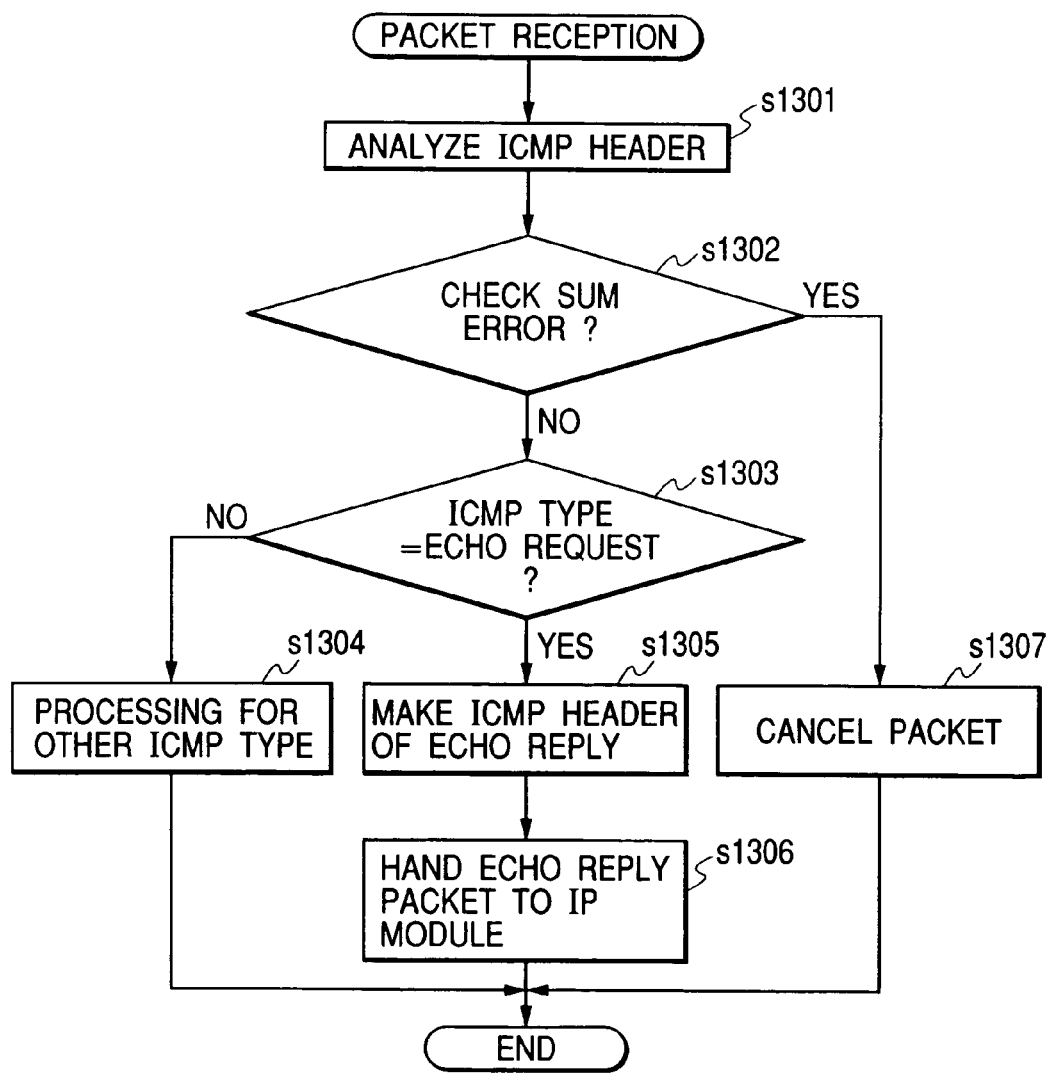
FIG. 13 is a flowchart showing a flow of processes of a general ICMP management module 404.

Further, as a continuation of step S1209 in FIG. 12, a flow of processes after the ICMP management module 404 received the packet by the ICMP protocol will now be described. FIG. 13 is a flowchart showing the operation after the ICMP management module 404 received the packet.

When the packet is received from the IP module 406, the ICMP management module 404 analyzes the ICMP Header shown in FIG. 8 in step S1301. The ICMP management module 404 checks the check sum 803 in step S1302 and if it is an illegal value, the packet is cancelled.

Whether the packet is the echo request message or not is discriminated (S1303) by checking the ICMP type 801. If it is not the echo request message, other processing is executed in step S1304.

If the received packet is the echo request message, a preparation to return an echo reply message is made in step S1305. In case of returning the echo reply message, the ICMP management module 404 forms the ICMP Header as shown in FIG. 8. A code indicative of the ICMP reply is set to the ICMP type 801. "0" is set to the ICMP code 802. An identifier of the received ICMP echo request message is set to the ID 804. The sequence number of the received ICMP echo request message is set to the sequence No. 805.

Finally, the check sum is calculated and set. In step S1306, the formed echo reply packet is handed to the IP module 406.

The IP module 406 adds the IP Header as shown in FIG. 7 to the packet formed by the ICMP management module 404. The own IP address is set to the source IP address 710 of the IP Header. The source IP address of the received IP packet is set to the destination address. The formed IP packet is handed to the network driver module 304.

The network driver module 304 adds the Ethernet Header as shown in FIG. 6 to the packet formed by the IP module 406. "0x0800" indicative of the IP protocol is set to the protocol type of the Ethernet Header. The own MAC address is set to the source address 602. The source MAC address of the received frame is set to the destination address 601.

The formed echo reply message is transmitted to the LAN 100 through the network I/F controller 206. In this instance, the CRC 505 is added to the end of the echo reply message.

The above processes are a flow of processes for the ordinary ICMP echo message. In the invention, the processes by the pseudo ICMP management module 405 are added to the processes of such a general ICMP echo message and a part of the processes of the IP module 406 is further changed. Thus, a safer IP address setting process by the ICMP echo request message is realized.

A flow of processes of the ICMP echo message in the invention will now be described hereinbelow.

As described above, when the ICMP echo request message is transmitted from the ping program executed by the PC 103, the network driver module 304 receives the ICMP echo request message from the LAN 100 through the network I/F controller 206. After the network driver module 304 executes the processes in accordance with the flowchart of FIG. 11, the packet is handed to the IP module 406. However, when the packet is handed from the network driver module 304 to the IP module 406, the packet is handed in its state without removing the Ethernet Header.

Figure 9:
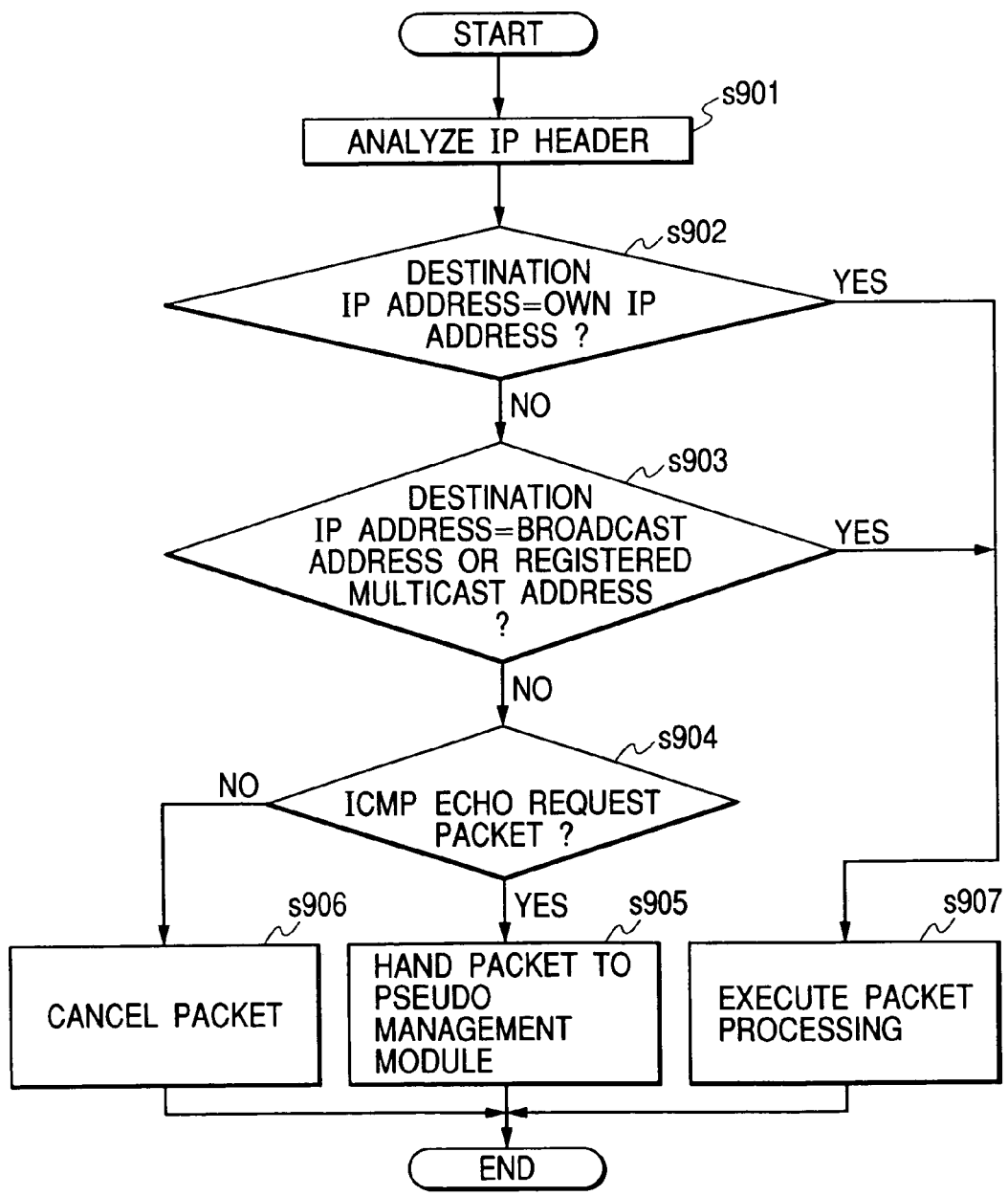
FIG. 9 is a flowchart showing a flow of processes of an IP module 406 of the invention.

FIG. 9 is a flowchart showing the operation after the IP module 406 received the packet. First, in step S901, after the check sum was confirmed, the IP Header in the received packet is analyzed.

In step S902, whether the destination IP address of the packet coincides with the own IP address or not is discriminated. If they coincide, processes similar to those in FIG. 12 are executed in step S907.

In step S902, if the destination IP address does not coincide with the own IP address, whether the destination IP address is either the broadcast address or the registered multicast address is discriminated in step S903. If the destination IP address is either the broadcast address or the registered multicast address, processes similar to those in FIG. 12 are executed in step S907.

As results of the discriminations in steps S902 and S903, if the destination IP address is none of the own IP address, broadcast address, and registered multicast address, the protocol ID 708 of the IP Header and the ICMP type 801 of the ICMP Header are subsequently checked in step S904, thereby discriminating whether the packet is the ICMP echo request message or not.

As a result of the discrimination of step S904, if the packet is not the ICMP echo request message, the packet is cancelled in step S906. If it is the ICMP echo request message, the received packet is handed to the pseudo ICMP management module 405 in step S905. In this instance, the IP module 406 does not remove the Ethernet Header and IP Header from the packet. That is, the packet is handed as it is to the pseudo ICMP management module 405 as a packet received by the network driver module 304 from the LAN 100.

Figure 10:
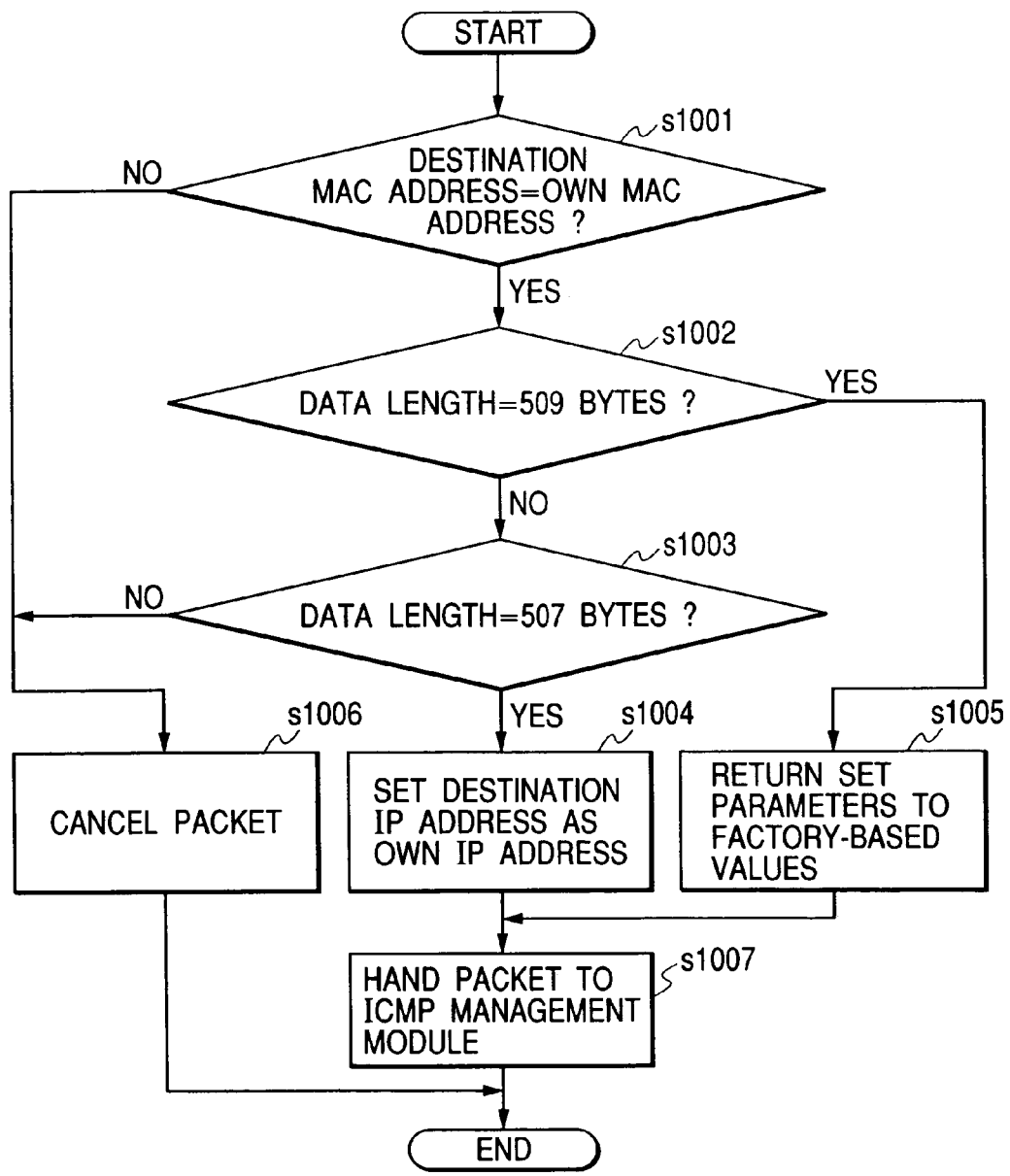
FIG. 10 is a flowchart showing a flow of processes of a pseudo ICMP management module 405 in the first embodiment.

A flow of processes of the pseudo ICMP management module 405 will now be described. FIG. 10 is a flowchart showing the operation after the pseudo ICMP management module 405 received the packet. When the pseudo ICMP management module 405 receives the packet from the IP module 406, in step S1001, the Ethernet Header 501 of the packet is checked, thereby discriminating whether the destination MAC address 601 of the packet coincides with the own MAC address or not. When it does not coincide with the own MAC address, the packet is cancelled in step S1006.

When the destination MAC address coincides with the own MAC address in step S1001, the data length 704 of the IP Header 502 is checked in step S1002, thereby discriminating whether the data length 704 is equal to 509 bytes or not. If YES, all of the setting parameters stored in the NVRAM 205 are changed to factory-based values in step S1005.

In step S1002, if the data length 704 is not equal to 509 bytes, whether the data length 704 is equal to 507 bytes or not is discriminated in step S1003. If the data length 704 is equal to neither 509 bytes nor 507 bytes, the packet is cancelled in step S1006.

When the data length 704 is equal to 507 bytes in step S1003, the destination IP address 711 of the IP Header 502 is set as an own IP address in step S1004. After the IP address was set, the pseudo ICMP management module 405 hands the packet to the ICMP management module 404. In this instance, the unnecessary Ethernet Header and IP Header are removed.

The ICMP management module 404 executes processes similar to those of FIG. 13 and returns the echo reply message to the PC 103.

The processes in the network device apparatus have been described above. The processes in the PC 103 will now be described. A general ping program has been installed in the host computer which can communicate by the TCP/IP. The user can transmit the ICMP echo request message by using this program.

The user, therefore, executes the processes in the following procedure in case of setting the IP address from the PC 103 to the network board 101.

(1) The MAC address of the network board and the IP address to be set are registered in the ARP table of the PC 103 by using the ARP program.

(2) The ICMP echo request message is transmitted toward the IP address to be set by using the ping program. In this instance, the data length 704 is adjusted so that it is equal to 507 bytes by using an option of the ping program (generally, the buffer size to be transmitted can be designated by the "−l" option). If the user wants to change the setting parameters to the factory-based values, it is adjusted so that the data length 704 is equal to 509 bytes by using the option.

Usually, in the echo request message by the ping program, the data length 704 of the IP Header is equal to 64 bytes. Therefore, even if the ICMP echo request message is newly and usually transmitted toward the set IP address, in the network device apparatus in the invention, the packet is cancelled in step S1006 in FIG. 10.

In the invention, to cancel the setup of the IP address by the execution of the ordinary ping program, an attention is paid to the data length 704 of the IP Header of the ICMP echo request message and the IP address is set only when the data length 704 is equal to a certain data length.

Second Embodiment

Although the attention has been paid to the data length 704 of the IP Header of the ICMP echo request message in the first embodiment, an attention is paid to the TTL (Time To Live) 707 of the IP Header in the second embodiment. The TTL value is expressed by 8 bits and set to a numerical value in a range from 0 to 255. Generally, it is set to 32 or 64.

This value is referred to by a router in the network. When the router receives the packet, "1" is subtracted from the TTL value of the packet. When the TTL value is equal to 0, consequently, the router cancels the packet. Therefore, if the TTL value is initially equal to 32, the packet can pass through up to 32 routers. By this construction, the packet can be prevented from being permanently transferred between the networks.

In the network environment in the embodiment, it is assumed that this value is not subtracted.

Figure 14:
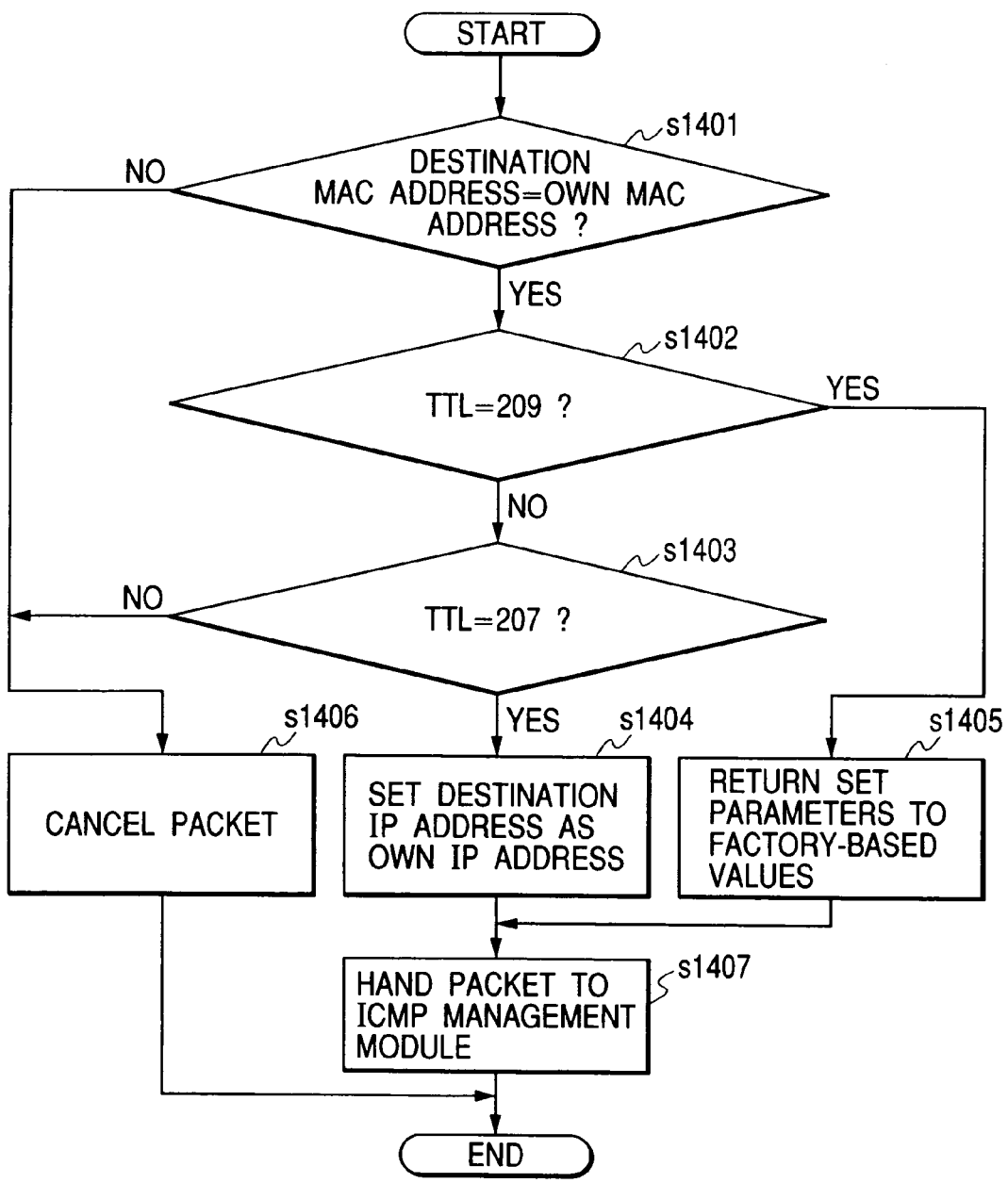
FIG. 14 is a flowchart showing a flow of processes of a pseudo ICMP management module 405 in the second embodiment.

Therefore, in the second embodiment, a flowchart of FIG. 14 is used in place of the flowchart of FIG. 10 in the first embodiment. Since the other processes are similar to those in the first embodiment, their descriptions are omitted here.

FIG. 14 is a flowchart showing the operation after the pseudo ICMP management module 405 received the packet. When the pseudo ICMP management module 405 received the packet from the IP module 406, the Ethernet Header 501 of the packet is checked in step S1401, thereby discriminating whether the destination MAC address 601 of the packet coincides with the own MAC address or not. When it does not coincide with the own MAC address, the packet is cancelled in step S1406.

When the destination MAC address coincides with the own MAC address in step S1401, the TTL 707 of the IP Header 502 is checked in step S1402, thereby discriminating whether the value of the TTL 707 is equal to 209 or not. When the TTL 707 is equal to 209, all of the setting parameters stored in the NVRAM 205 are changed to the factory-based values in step S1405.

If the TTL 707 is not equal to 209 in step S1402, whether the TTL 707 is equal to 207 or not is further discriminated in step S1403. If the TTL 707 is equal to neither 209 nor 207, the packet is cancelled in step S1406.

When the TTL 707 is equal to 207 in step S1403, the destination IP address 711 of the IP Header 502 is set as an own IP address in step S1404.

After the pseudo ICMP management module 405 set the IP address, the packet is handed to the ICMP management module 404. In this instance, the unnecessary Ethernet Header and IP Header are removed.

The ICMP management module 404 performs processes similar to those in FIG. 13 and returns the echo reply message to the PC 103.

The processes in the network device apparatus have been described above. The processes in the PC 103 will now be described. The ping program has generally been installed in the host computer which can communicate by the TCP/IP. The user can transmit the ICMP echo request message by using this program.

In case of setting the IP address to the network board 101 from the PC 103, the user executes the processes by the following procedure.

(1) The MAC address of the network board and the IP address to be set are registered in the ARP table of the PC 103 by using the ARP program.

(2) The ICMP echo request message is transmitted toward the IP address to be set by using the ping program. In this instance, the TTL 707 is adjusted so that its value is equal to 207 by using an option of the ping program (generally, the TTL value can be designated by the "−l" option). If the user wants to change the setting parameters to the factory-based values, it is adjusted so that the TTL value is equal to 209 by using the option.

Generally, in the echo request message by the ping program, the TTL value of the IP Header is equal to 32 or 64. Therefore, even if the ICMP echo request message is newly and usually transmitted toward the set IP address, in the network device apparatus in the invention, the packet is cancelled in step S1003 in FIG. 10.

In the invention, to cancel the setup of the IP address by the execution of the ordinary ping program, an attention is paid to the TTL 707 of the IP Header of the ICMP echo request message and the IP address is set only when the TTL 707 is equal to a certain value.

Third Embodiment

Figure 15:
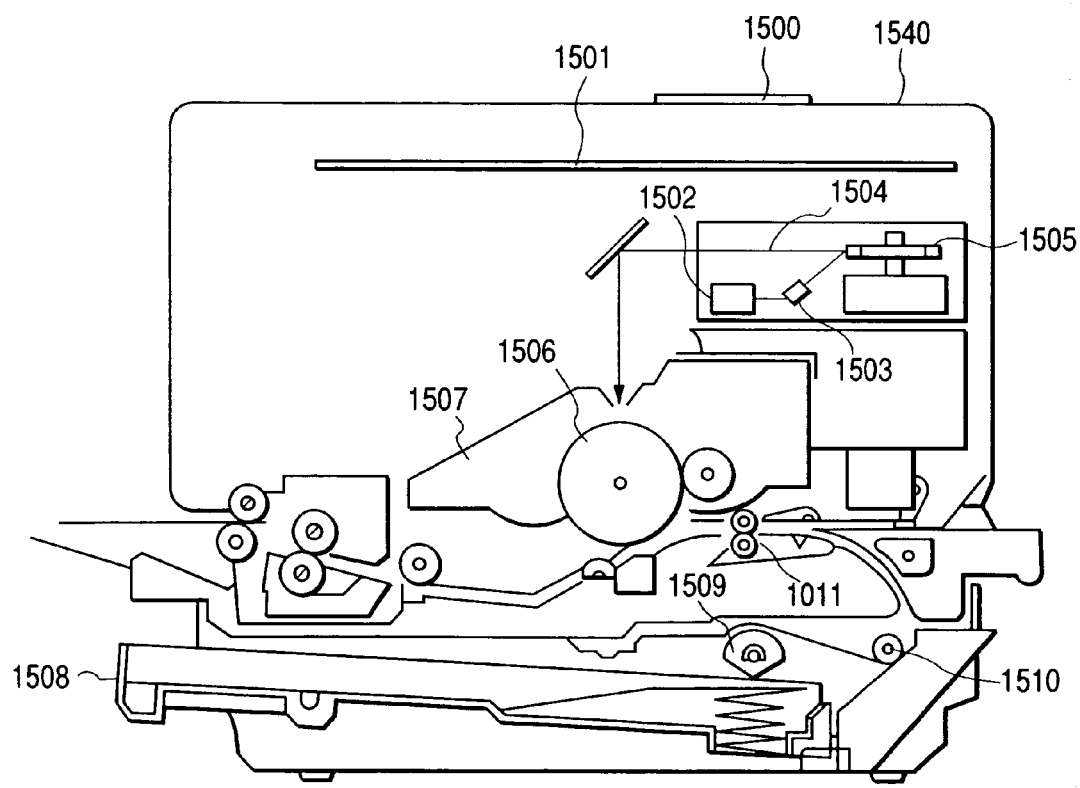
FIG. 15 is a cross sectional view showing an internal structure of a laser beam printer.

Although the invention has been realized by the network board in the first and second embodiments, even if the invention is realized by a printer itself such as laser beam printer, ink jet printer, or the like, the objects of the invention can be also accomplished. FIG. 15 is a cross sectional view showing an internal structure of the laser beam printer in this case. The LBP can input character pattern data or the like and print onto a recording paper.

In FIG. 15, reference numeral 1540 denotes an LBP main body to form an image onto the recording paper as a recording medium on the basis of a supplied character pattern or the like. Reference numeral 1500 denotes an operation panel on which switches for the operation, an LED display, and the like are arranged; and 1501 indicates a printer control unit to control the whole LBP 1540 and analyze character pattern information or the like. The printer control unit 1501 mainly converts the character pattern information to a video signal and outputs it to a laser driver 1502.

The laser driver 1502 is a circuit to drive a semiconductor laser 1503 and on/off switches a laser beam 1504 emitted from the semiconductor laser 1503 in accordance with the inputted video signal. The laser beam 1504 is swung to the right and left by a rotary polygon mirror 1505 and scans on an electrostatic drum 1506. Thus, an electrostatic latent image of a character pattern is formed on the electrostatic drum 1506. The latent image is developed by a developing unit 1507 around the electrostatic drum 1506 and, thereafter, transferred onto the recording paper.

Cut sheets are used as recording papers. The cut sheet recording papers are enclosed in a plurality of paper cassettes 1508 corresponding to a plurality of kinds of papers set in the LBP 1540, fetched into the apparatus by a paper feed roller 1509 and conveying rollers 1510 and 1511 and supplied to the electrostatic drum 1506.

Figure 16:
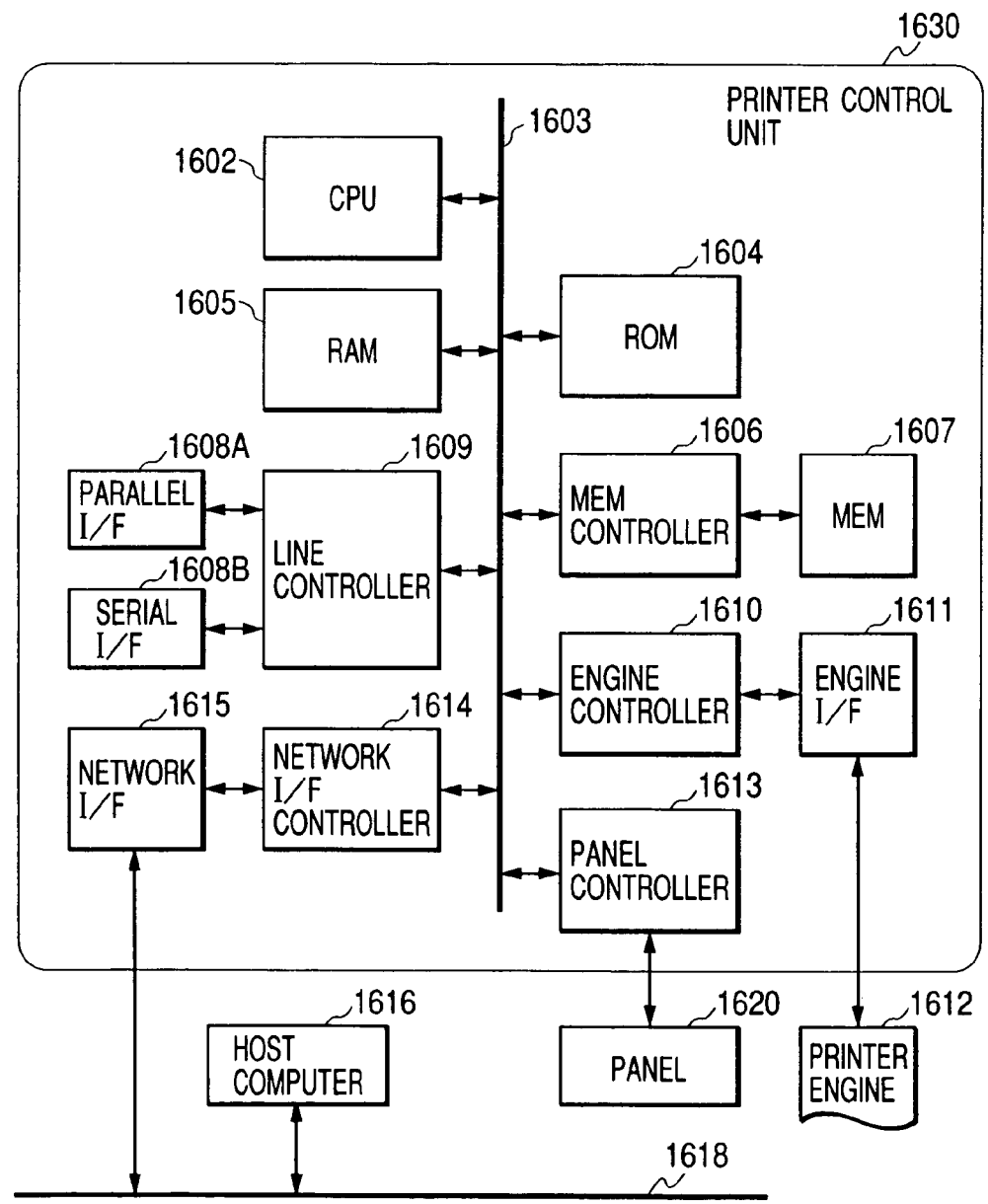
FIG. 16 is a block diagram showing a control construction to execute a recording control of the laser beam printer.

A control construction to execute a recording control of the laser beam printer will now be described with reference to a block diagram shown in FIG. 16. In FIG. 16, reference numeral 1630 denotes a printer control unit. The printer control unit 1630 is constructed so that it can communicate with a host computer 1616 connected to a network 1618 through a network I/F control unit 1614 for controlling a network I/F 1615.

Reference numeral 1602 denotes a CPU to control each device connected to a bus 1603 on the basis of a control program recorded in an ROM 1604. The CPU 1602 executes a program (flowcharts described in the first and second embodiments or the like) regarding the invention, so that the invention is realized. Reference numeral 1605 denotes an RAM to temporarily store data which is used by the CPU 1602, print data, and the like.

Reference numeral 1610 denotes an engine controller to control a printer engine 1612 through an engine I/F 1611 and perform a printing process.

Reference numeral 1606 denotes a memory controller to control a memory 1607; 1609 a line controller to control a parallel I/F 1608A and a serial I/F 1608B; and 1613 a panel controller to control a panel 1620.

Reference numeral 1618 denotes the network to connect the printer control unit 1630 and host computer 1616.

Figure 17:
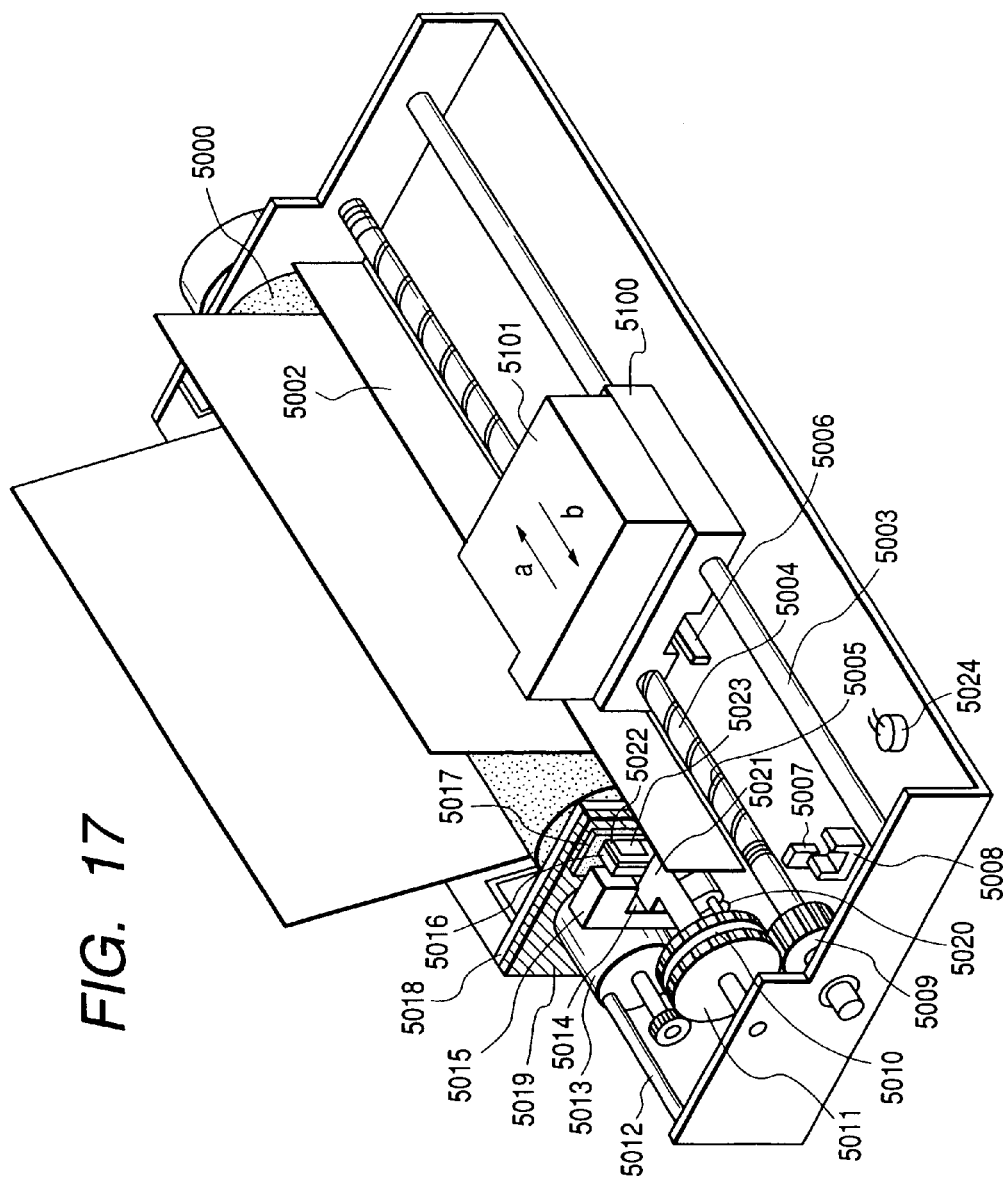
FIG. 17 is a schematic diagram showing an internal structure of an ink jet recording apparatus.

Although the laser beam printer has been described above as an example, the invention is not limited to it but can be also applied to an ink jet printer or the like which will be explained hereinbelow. FIG. 17 is a schematic diagram of an ink jet recording apparatus which can feed a plurality of kinds of papers (not shown) in correspondence to a print job.

In the diagram, a lead screw 5005 which rotates through driving force transfer gears 5011 and 5009 in an interlocked relation with the forward/reverse rotation of a driving motor 5013. A carriage 5100 adapted to be come into engagement with a spiral groove 5004 of the lead screw 5005 has a pin (not shown) and is reciprocated in the directions shown by arrows a and b. An ink jet cartridge 5101 is mounted on the carriage 5100.

Reference numeral 5002 denotes a paper pressing plate for pressing the paper onto a platen 5000 in a range over the moving direction of the carriage. Reference numerals 5007 and 5008 denote photocouplers serving as home position detecting means for confirming the existence of a lever 5006 of the carriage in a region where each photocoupler exists and performing the switching or the like of the rotating direction of the motor 5013.

Reference numeral 5016 denotes a member for supporting a cap member 5022 to cap the front surface of a recording head; and 5015 indicates sucking means for sucking the air in the cap. The sucking means performs the sucking and recovery of the recording head through an opening 5023 in the cap.

Reference numeral 5017 denotes a cleaning blade; and 5019 indicates a member for enabling the cleaning blade to be moved in the front/rear directions. The cleaning blade 5017 and member 5019 are supported to a main body supporting plate 5018. The cleaning blade is not limited to the shape shown in the diagram but a well-known cleaning blade can be also applied to the invention. Reference numeral 5021 denotes a lever to start the sucking in the sucking/recovery operation. The lever is moved in association with the movement of a cam 5020 adapted to be come into engagement with the carriage. A driving force from the driving motor is transferred and controlled by well-known transfer means such as a clutch change-over switch or the like.

Although the capping, cleaning, and sucking recovery processes are constructed in a manner such that when the carriage reaches a region on the home position side, a desired process can be performed at a corresponding position by the operation of the lead screw 5005, an arbitrary construction can be applied to the invention so long as a desired operation is performed at a well-known timing.

A control construction to execute the recording control of the ink jet recording apparatus mentioned above will now be described with reference to a block diagram shown in FIG. 18. In the diagram showing the control circuit, reference numeral 1800 denotes an interface to input a recording signal; 1801 an MPU; 1802 a program ROM to store a control program which is executed by the MPU 1801; and 1803 a dynamic RAM to store various data (the recording signal, recording data which is supplied to the head, and the like). The MPU 1801 executes the program (flowcharts described in the first and second embodiments, and the like) according to the invention, so that the invention is realized.

Reference numeral 1804 denotes a gate array to control the supply of the recording data to a recording head 1808. The gate array 1804 also controls a data transfer among the interface 1800, MPU 1801, and RAM 1803. Reference numeral 1810 denotes a carriage motor to convey the recording head 1808; 1809 a paper feed motor to convey the recording paper;

1805 a head driver to drive the head; and 1806 and 1807 motor drivers to drive the paper feed motor 1809 and carriage motor 1810.

The operation of the control construction will now be described. When the recording signal is inputted to the interface 1800, the recording signal is converted to recording data for printing between the gate array 1804 and MPU 1801. The motor drivers 1806 and 1807 are driven, the recording head is driven in accordance with the recording data transmitted to the head driver 1805, and the print is performed.

The component elements of the invention can be also built in the control construction of the ink jet printer as mentioned above and the invention is not limited to the laser beam printer but can be also obviously applied to the ink jet printer or the like.

Fourth Embodiment

The invention can be applied to a system comprising a plurality of apparatuses (for example, a host computer, an interface device, a reader, a printer, etc.) or can be also applied to an apparatus (for example, a copying apparatus, a facsimile apparatus, or the like) comprising one equipment.

Figure 18:
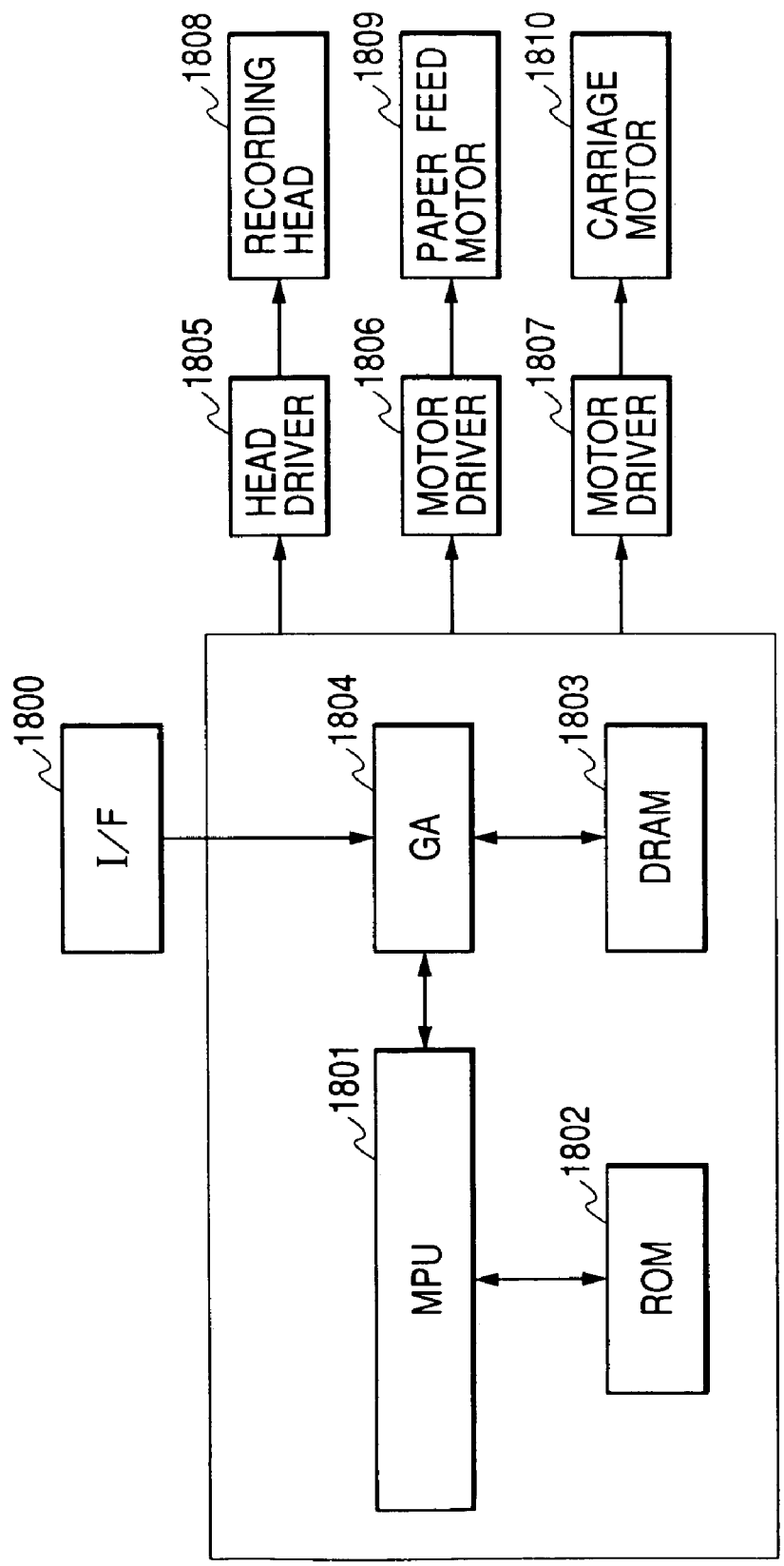
FIG. 18 is a block diagram showing a control construction to execute a recording control of the ink jet recording apparatus.
Figure 19:
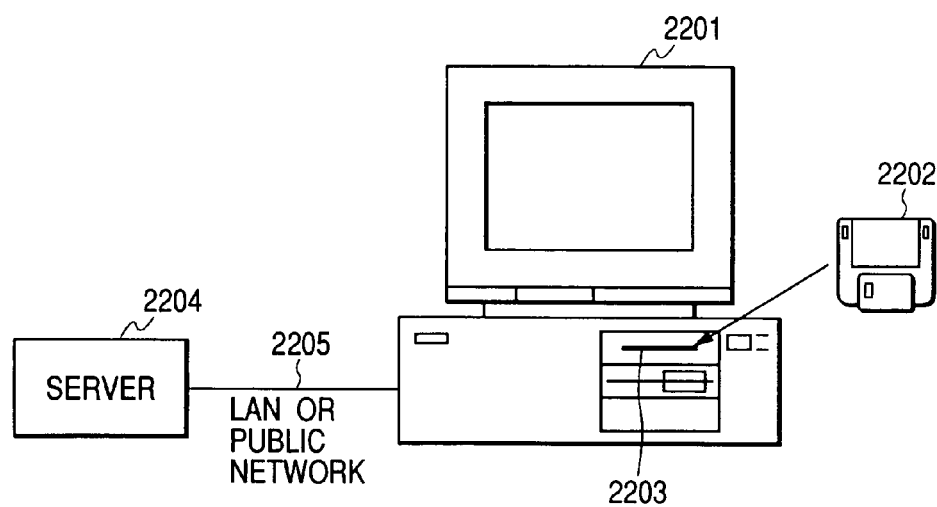
FIG. 19 is a diagram showing an example of a supplying method of program codes according to the invention.

As shown in FIG. 19, the objects of the invention can be also accomplished by a construction such that a memory medium in which program codes of software to realize the functions of the first, second, and third embodiments mentioned above have been recorded is supplied to the system or apparatus shown in FIGS. 2, 16, and 18 and a computer (or a CPU or an MPU) of the system or apparatus reads out and executes the program codes stored in the memory medium.

As shown in FIG. 19, the objects of the invention are also accomplished by a construction such that the program codes of software to realize the functions of the first, second, and third embodiments mentioned above are supplied from a server computer 2204 to the system or apparatus shown in FIGS. 2, 16, and 18 through an LAN or public network 2205 and the computer (or CPU or MPU) of the system or apparatus executes the supplied program codes.

In this case, the program codes themselves read out from the memory medium realize the functions of the embodiments mentioned above and the memory medium storing the program codes and the server apparatus which transmits the program codes construct the invention.

Although the embodiment has been shown with respect to the example in which the present program and associated data are directly loaded from the memory medium into the RAM and executed, it is also possible to use another construction such that the present program and associated data are once stored (installed) from an external memory medium such as an FD or the like to a hard disk as a non-volatile memory medium in the external memory and, when the present data forming and transmitting processing control program is made operative, they are loaded from the hard disk into the RAM.

As a memory medium to supply the program codes, for example, it is possible to use a floppy disk, a hard disk, an optical disk, a magnetooptic disk, a CD-ROM, a CD-R, a magnetic tape, a non-volatile memory card, an ROM, or the like. The invention incorporates not only the case where the functions of the embodiments mentioned above are realized by executing the read-out program codes by the computer but also the case where an OS (Operating System) or the like which operates on the computer executes a part or all of the actual processes on the basis of instructions of the program codes and the functions of the embodiments mentioned above are realized by the processes.

The invention further incorporates the case where the program codes read out from the memory medium are written in a memory equipped for a function expanding board inserted in a computer or a function expanding unit connected to the computer and, after that, a CPU or the like equipped for the function expanding board or function expanding unit executes a part or all of the actual processes on the basis of the instructions of the program codes, and the functions of the embodiments mentioned above are realized by the processes.

As described above, according to the invention, while the general program installed as a standard program in the PC or the like is used, the setup of the IP address in the network device apparatus and the setup of the factory-based values of the setting parameters can be safely performed in accordance with the attribute value in the network protocol of the data to be transmitted.

What is claimed is:

1. A network apparatus comprising:
   a receiving unit for receiving data from a network;
   a detecting unit for detecting a value indicative of a data length, the value being in a packet header of the data received by said receiving unit, the packet header being provided for a predetermined protocol; and
   a setting unit for setting a logic address of said network apparatus based on a destination logic address of the received data so that the logic address of said network apparatus and the destination logic address of the received data are the same in a case where the detected value indicative of the data length is a specific value indicative of a specific data length different from actual data length of the received data, and a destination physical address of the received data and a physical address of said network apparatus are the same.

2. An apparatus according to claim 1, wherein, in a case where the destination logic address of the received data and the logic address of said network apparatus differ, the destination physical address of the received data and the physical address of said network apparatus are the same, and the detected value indicative of the data length is the specific value, said setting unit sets the destination logic address of the received data as the logic address of said network apparatus.

3. An apparatus according to claim 1, wherein the physical address is a media access control address, and the logic address is an Internet protocol address.

4. An apparatus according to claim 3, wherein the received data is an ICMP echo message by an ICMP protocol and the detected value indicates a data length of the ICMP echo message.

5. A network apparatus comprising:
   a receiving unit for receiving data from a network;
   a detecting unit for detecting a TTL value, the value being in a packet header of the data received by said receiving unit, the packet header being provided for a predetermined protocol, the TTL value being referred to by a router and reduced by the router when the router receives the data; and
   a setting unit for setting a logic address of said network apparatus based on a destination logic address of the received data so that the logic address of said network apparatus and the destination logic address of the received data are the same in a case where the detected TTL value is a specific TTL value, and a destination physical address of the received data and a physical address of said network apparatus are the same.

6. An apparatus according to claim 5, wherein the received data is an ICMP echo message by an ICMP protocol and the detected value indicates a data length of the ICMP echo message.

7. A network apparatus comprising:
a receiving unit for receiving an ICMP echo message;
a data length detecting unit for detecting a value indicative of a data length, the value being in a packet header of the ICMP echo message received by said receiving unit; and
a setting unit for setting an IP address of said network apparatus based on a destination IP address of the received ICMP echo message so that the IP address of said network apparatus and the destination IP address of the received data are the same if the detected value indicative of the data length is a specific value indicative of a specific data length different from actual data length of the received ICMP echo message, and a destination MAC address of the received ICMP echo message and a MAC address of said network apparatus are the same.

8. An apparatus according to claim 7, wherein if the destination IP address of the received ICMP echo message and the IP address of said network apparatus differ and the destination MAC address of the received ICMP echo message and the MAC address of said network apparatus are the same, said setting unit sets the IP address of said network apparatus in accordance with the detected value indicative of the data length.

9. A method of controlling a network device comprising:
a receiving step, of receiving data from a network;
a detecting step, of detecting a value indicative of a data length, the value being in a packet header of the received data, the packet header being provided for a predetermined protocol; and
a setting step, of setting a logic address of said network apparatus based on a destination logic address of the received data so that the logic address of said network apparatus and the destination logic address of the received data are the same in a case where the detected value indicative of the data length is a specific value indicative of a specific data length different from actual data length of the received data, and a destination physical address of the received data and a physical address of the network device are the same.

10. A method according to claim 9, wherein, in a case where the destination logic address of the received data and the logic address of said network apparatus differ, the destination physical address of the received data and the physical address of said network apparatus are the same, and the detected value indicative of the data length is the specific value, said setting step sets the destination logic address of the received data as the logic address of said network apparatus.

11. A method according to claim 9, wherein the received data is an ICMP echo message by an ICMP protocol and the detected value indicates a data length of the ICMP echo message.

12. A method of controlling a network device comprising:
a receiving step, of receiving data from a network;
a detecting step, of detecting a TTL value, the value being in a packet header of the received data, the packet header being provided for a predetermined protocol, the TTL value being referred to by a router and reduced by the router when the router receives the data; and
a setting step, of setting a logic address of said network apparatus based on a destination logic address of the received data so that the logic addresses of said network apparatus and the destination logic address of the received data are the same in a case where the detected TTL value is a specific TTL value, and a destination physical address of the received data and a physical address of the network device are the same.

13. A method of controlling a network device comprising:
a receiving step, of receiving an ICMP echo message;
a data length detecting step, of detecting a value indicative of a data length, the value being in a packet header of the received ICMP echo message; and
a setting step, of setting an IP address of said network apparatus based on a destination IP address of the received ICMP echo message so that the IP address of said network apparatus and the destination IP address of the received data are the same if the detected value indicative of the data length is a specific value indicative of a specific data length different from actual data length of the received ICMP echo message, and a destination MAC address of the received ICMP echo message and a MAC address of the network device are the same.

14. A method according to claim 13, wherein in said setting step, if the destination IP address of the received ICMP echo message and the IP address of said network apparatus differ and the destination MAC address of the received ICMP echo message and the MAC address of said network apparatus are the same, the IP address of the network device is set in accordance with the detected data length.

15. A network apparatus comprising:
a receiving unit for receiving data from a network;
a detecting unit for detecting a value indicative of a data length, the value being in a packet header of the data received by said receiving unit, the packet header being provided for a predetermined protocol; and
a setting unit for setting an address of said network apparatus based on a destination address of the received data so that the address of said network apparatus and the destination address of the received data are the same in a case where the detected value indicative of the data length is a specific value indicative of a specific data length different from actual data length of the received data, and a destination physical address of the received data and a physical address of said network apparatus are the same.

16. An apparatus according to claim 15, wherein the address is an Internet protocol address.

17. A network apparatus comprising:
a receiving unit for receiving data from a network;
a detecting unit for detecting a value indicative of a data length, the value being in a packet header of the data received by said receiving unit, the packet header being provided for a predetermined protocol; and
a setting unit for setting an address of said network apparatus based on a first destination address of the received data so that the address of said network apparatus and the first destination address of the received data are the same in a case where the detected value indicative of the data length is a specific value indicative of a specific data length different from actual data length of the received data, and a second destination address of the received data and an address unique to said network apparatus are the same,
wherein the first and second destination address differ from each other.

* * * * *